United States Patent
Ali et al.

(10) Patent No.: US 12,256,274 B2
(45) Date of Patent: Mar. 18, 2025

(54) EVOLVED PACKET CORE TO 5G CORE ROAMING USING N9 INTERFACE

(71) Applicant: Cisco Technology, Inc., San Jose, CA (US)

(72) Inventors: Irfan Ali, Palo Alto, CA (US); Ravi Shankar Mantha, Bangalore (IN); Ravi Kiran Guntupalli, Cumming, GA (US); Jis Abraham, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 461 days.

(21) Appl. No.: 17/846,729

(22) Filed: Jun. 22, 2022

(65) Prior Publication Data

US 2023/0114175 A1    Apr. 13, 2023

(30) Foreign Application Priority Data

Oct. 10, 2021  (IN) .............................. 202121046119

(51) Int. Cl.
| | |
|---|---|
| *H04W 36/00* | (2009.01) |
| *H04M 15/00* | (2024.01) |
| *H04W 8/02* | (2009.01) |
| *H04W 36/30* | (2009.01) |
| *H04W 92/06* | (2009.01) |

(52) U.S. Cl.
CPC ... *H04W 36/0066* (2013.01); *H04M 15/8038* (2013.01); *H04W 8/02* (2013.01);
(Continued)

(58) Field of Classification Search
CPC .............. H04W 36/0066; H04W 8/02; H04W 36/0016; H04W 36/304; H04W 92/06;
(Continued)

(56) References Cited

U.S. PATENT DOCUMENTS

| | | | |
|---|---|---|---|
| 11,057,865 B1 * | 7/2021 | Wong | .................. H04W 68/005 |
| 2019/0254118 A1 | 8/2019 | Pao et al. | |

(Continued)

FOREIGN PATENT DOCUMENTS

| | | |
|---|---|---|
| WO | 2020213816 | 10/2020 |
| WO | 2021078287 A1 | 4/2021 |
| WO | 20210149010 | 7/2021 |

OTHER PUBLICATIONS

International Search Report and Written Opinion for PCT Application No. PCT/US2022/077669, mailed on Jan. 30, 2023, 13 pages.

(Continued)

*Primary Examiner* — Sharad Rampuria
(74) *Attorney, Agent, or Firm* — Polsinelli P.C.

(57) ABSTRACT

A system is provided for supporting roaming between LTE EPC network and 5G network of a first mobile network operator by 5GC network of a second network operator. The system may include the EPC network including a serving gateway in communication with a 4G base station being in the EPC network. The system may also include the 5G network of the first mobile network operator including a vSMF in communication with a 5G base station being in the 5G network of the first network operator. The system may also include the 5GC network of the second network operator including a hSMF. The vSMF is configured to receive a communication from the serving gateway to anchor mobility between the LTE EPC network and the 5G network of the first mobile network operator, and to communicate with the hSMF in the 5GC network of the second network operator using 5G roaming interfaces.

20 Claims, 22 Drawing Sheets

(52) U.S. Cl.
CPC ..... *H04W 36/0016* (2013.01); *H04W 36/304* (2023.05); *H04W 92/06* (2013.01)

(58) Field of Classification Search
CPC . H04W 4/24; H04W 88/06; H04W 36/00222; H04M 15/8038; H04M 15/41; H04M 15/66; H04M 15/8044; H04L 12/1407
See application file for complete search history.

(56) References Cited

U.S. PATENT DOCUMENTS

| | | | |
|---|---|---|---|
| 2020/0092758 A1 | 3/2020 | Youn et al. | |
| 2020/0383005 A1* | 12/2020 | Wu | H04W 28/24 |
| 2022/0182854 A1* | 6/2022 | Kim | H04W 48/18 |

OTHER PUBLICATIONS

"3rd Generation Partnership Project; Techncal Specification Group Services and System Aspects; System Architecture for the 5G System; Stage 2 (Release 15)," 3GPP Draft; 23501-150-RM, 3rd Generation Partnership Project (3GPP), Mobile Competence Centre; 650, Route Des Lucioles; F-06921 Sophia-Antipolis Cedex, France, Nov. 2017, 91 pages.
English Abstract for WO 2021078287, 12 pages, retrieved on Jun. 6, 2023.
"5GS Roaming Guidelines," GSMSA, Version 4.0, May 28, 2021, pp. 1-53.
"LI for NIDD in 5GS in TS 33.127," 3GPP, Apr. 16, 2021, pp. 1-7.

* cited by examiner

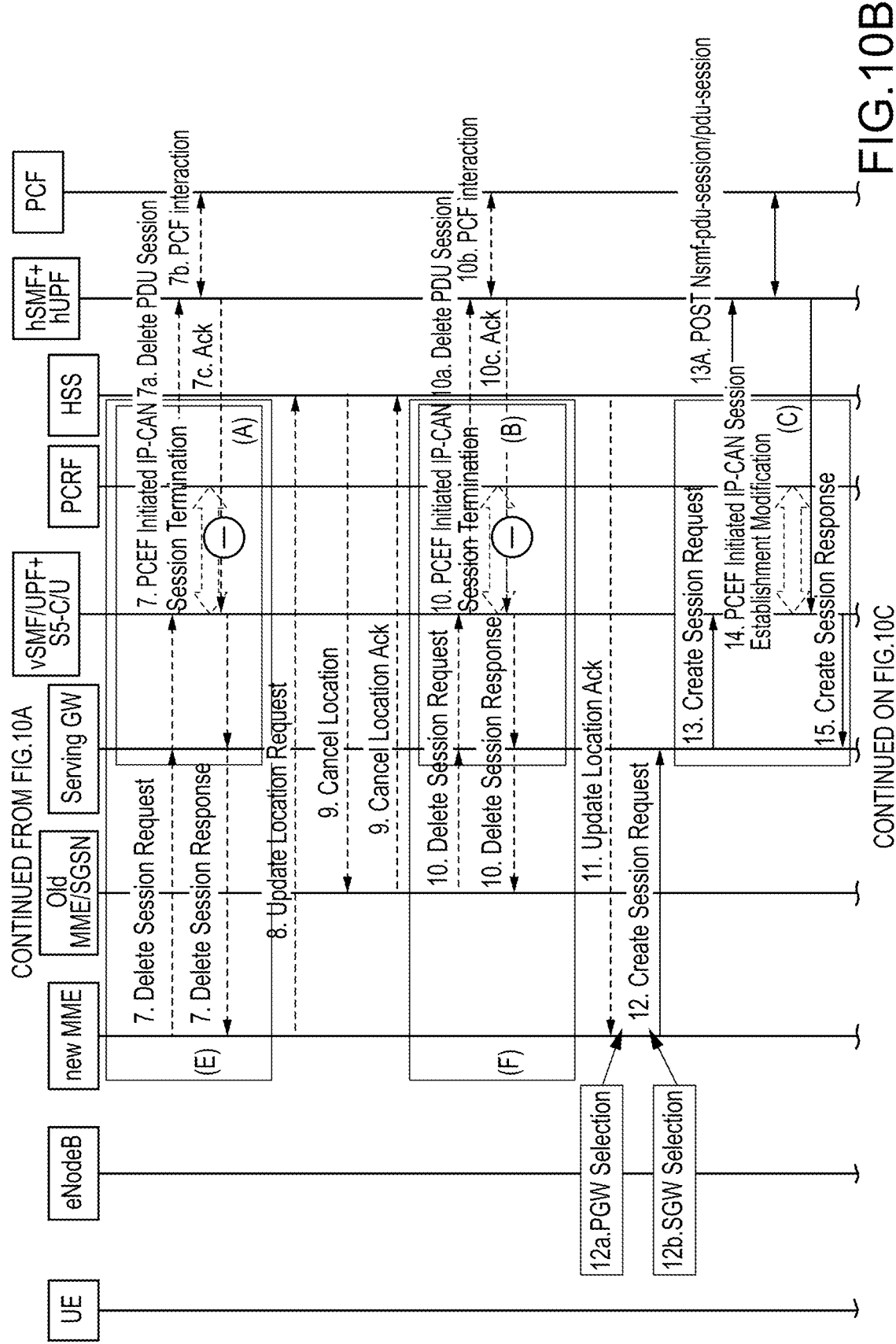

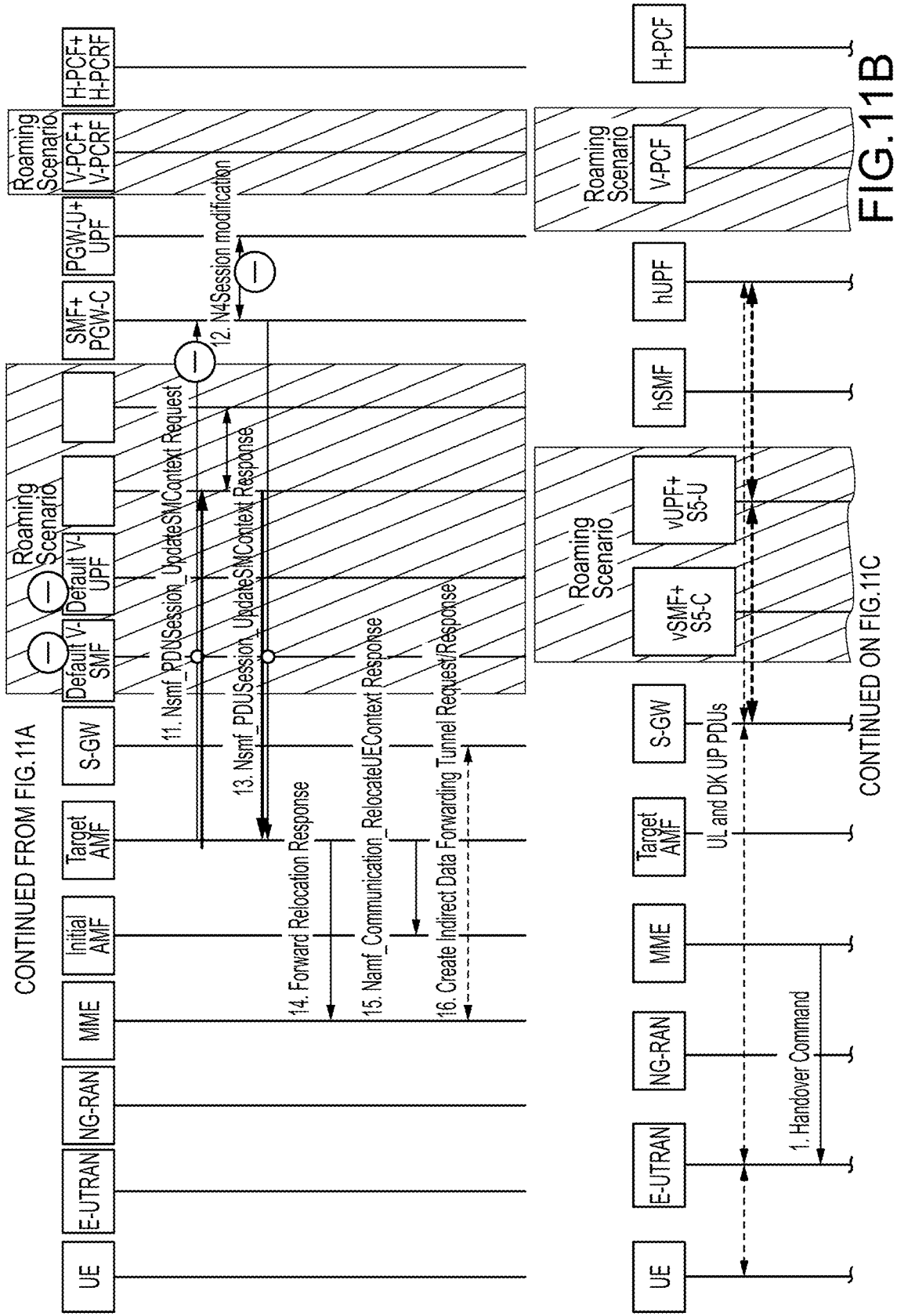

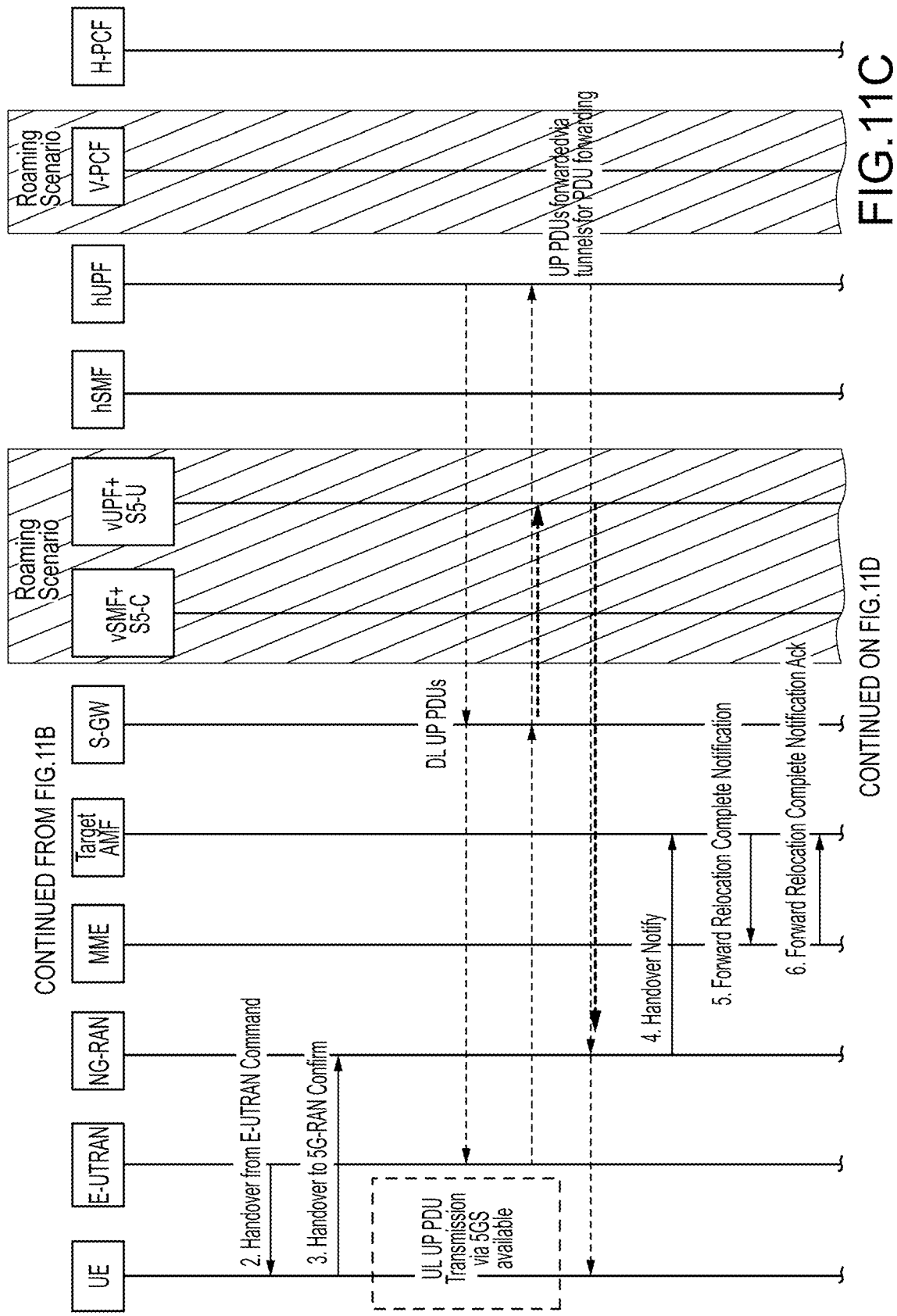

EVOLVED PACKET CORE TO 5G CORE ROAMING USING N9 INTERFACE

CROSS-REFERENCE TO RELATED PATENT APPLICATIONS

This patent application claims the benefit under 35 U.S.C. § 119(e) of Indian Patent Application Serial No. 202121046119, entitled "EVOLVED PACKET CORE TO 5G CORE ROAMING USING N9 INTERFACE," filed on Oct. 10, 2021, which is incorporated herein by reference in its entirety.

BACKGROUND

Fifth-generation (5G) mobile and wireless networks will provide enhanced mobile broadband communications and are intended to deliver a wider range of services and applications as compared to all prior generation mobile and wireless networks. Compared to prior generations of mobile and wireless networks, the 5G network architecture is service-based, meaning that wherever suitable, architecture elements are defined as network functions that offer their services to other network functions via common framework interfaces. The 5G networks or 5G core networks provide customers with higher data transfer speeds by pairing a 5G Radio Access Network (RAN) with the LTE Evolved Packet Core (EPC). The 5G RAN remains reliant on the 4G core network to manage control and signaling information and the 4G RAN continues to operate.

The combined 5G network that supports a 4G core network too is referred to as a non-standalone architecture (NSA). By leveraging the existing infrastructure of the 4G core network, carriers can provide faster and more reliable Enhanced Mobile Broadband (eMBB) without completely reworking their core network technology and pushing customers to new devices. The 5G NSA provides a transitionary platform for carriers and customers alike.

The 5G core network is also referred to as a standalone architecture (SA). 5G SA does not depend on an LTE EPC to operate. Rather, the 5G SA pairs 5G radios with a cloud-native 5G core network. The 5G core network is designed as a Service-Based Architecture (SBA) which virtualizes network functions to provide the full range of 5G features an enterprise needs for factory automation, autonomous vehicle operation, and more.

Roaming extends the coverage of a home operator's services, allowing its mobile users to use those services within another operator's network, which may be in another country (international roaming) or the same country (national roaming). Many mobile network operators deploy both LTE (4G) and 5GC and introduce 5GS roaming as a complement to EPC roaming. Smooth interworking between EPC roaming and 5GC roaming is therefore essential.

BRIEF DESCRIPTION OF THE DRAWINGS

To describe how the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIG. 10B is a second part of the sequence diagram illustrating 4G attach in accordance with some aspects of the disclosed technology;

FIG. 11B is a second part of the sequence diagram illustrating 4G to 5G handover in accordance with some aspects of the disclosed technology;

FIG. 11C is a third part of the sequence diagram illustrating 4G to 5G handover in accordance with some aspects of the disclosed technology;

DETAILED DESCRIPTION

Figure 1A:
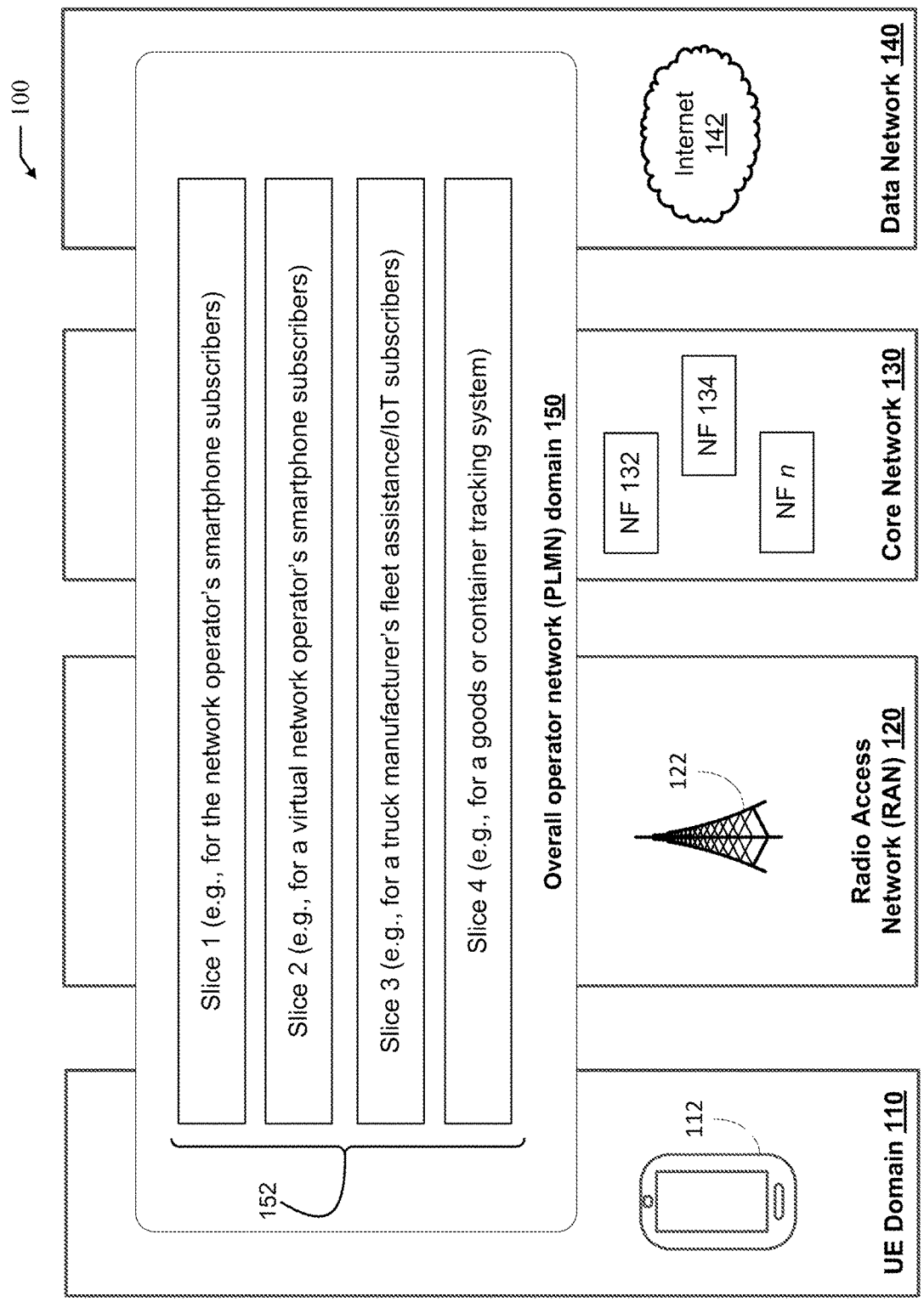
FIG. 1A depicts an example schematic representation of a 5G network environment in which network slicing has been implemented in accordance with some aspects of the disclosed technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described to avoid obscuring the description. References to one or an embodiment in the present disclosure can be references to the same embodiment or any embodiment; and such references mean at least one of the embodiments.

Reference to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles may be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description which follows, and in part will be obvious from the description, or can be learned by practice of the herein disclosed principles. The features and advantages of the disclosure can be realized and obtained utilizing the instruments and combinations particularly pointed out in the appended claims. These and other features of the disclosure will become more fully apparent from the following description and appended claims or can be learned by the practice of the principles set forth herein.

Overview

The disclosure provides an architecture that enables Greenfield operators, such as Charter, Comcast, DISH, among others, to deploy 5GCore (5GC) functionality. The architecture still enables roaming with existing mobile network operators (MNOs) that have 4G and 3G/2G deployed using 5G interfaces (e.g. interfaces N9 and N16) without requiring the Greenfield operators to deploy 4G interfaces (e.g. interface S8) and 4G functionality. Also, the disclosed architecture enables existing MNOs to upgrade their 4G/3G/2G roaming with other MNOs using 5G interfaces only and hence reducing complexity and inter-operability testing of 4G interfaces.

In one aspect, a system is provided for supporting roaming between LTE Evolved Packet Core (EPC) network and 5G network of a first mobile network operator by stand alone (SA) 5G core (5GC) network of a second network operator. The system may include the LIE EPC network including a serving gateway in communication with a 4G base station being in the EPC network. The system may also include the 5G network of the first mobile network operator including a Visited Session Management Function (vSMF) in communication with a 5G base station being in the 5G network of the first network operator. The system may also include the stand alone 5GC network of the second network operator including a home SMF (hSMF). The vSMF is configured to receive a communication from the serving gateway to anchor mobility between the LTE EPC network and the 5G network of the first mobile network operator, and to communicate with the hSMF in the 5GC network of the second network operator using 5G roaming interfaces.

In another aspect, a method is provided for supporting roaming between Evolved Packet Core (EPC) LTE network and 5G network of a first mobile network operator by stand alone (SA) 5G core (5GC) network of a second network operator. The method may include determining that a UE is attempting to connect to an LTE network operated by the first mobile network operator. The method may also include establishing a connection between a serving gateway of the LTE network of the first mobile network operator with a Visited Session Management Function (VSMF) of the 5G network of the first mobile network operator by communicating over an S5 interface for control plane. The method may also include communicating between the serving gateway and the vSMF to anchor mobility between the LTE network and the 5G network in the vSMF. The method may also include communicating between the vSMF and home SMF in a home operator using 5G roaming interfaces including interfaces N9 and N16. The method may also include communicating with the hSMF, by the vSMF, over the N16 interface for control plane to configure quality of service rules for handover between the LTE network and the 5G network. The method may also include forming a N9 tunnel from a hUPF of the 5GC network of the second network operator to a vUPF of the 5G network of the first mobile network operator for forwarding indirect data. The method may also include forming a S5 tunnel from the vUPF of the 5G network of the first mobile network operator to the serving gateway of the LTE network of the first mobile network operator. The method may further include forwarding the indirect data from the hUPF of the 5GC network of the second network operator during handover between the LTE network and the 5G network using the S5 tunnel in the first mobile network operator.

Example Embodiments

The disclosed technology addresses the need in the art for the Greenfield operators (e.g. an entity that is deploying a stand-alone 5G network without adding on to an existing LTE network) to allow devices supported by its network to roam from a 4G LTE network onto the stand-alone 5G network.

For local coverages, the Greenfield operators may have roaming agreements with MNOs that support both LTE radios (4G) and 5G coverages. The LTE radios are the most widely deployed cellular technology and may remain deployed for many more years. A conventional 3GPP architecture can enable this deployment but requires the Greenfield operators to support legacies (EPC/4G) interfaces, e.g. S8-C and S8-U interfaces, to support roaming. The Greenfield operators are also referred to as home operators.

The present technology provides an architecture that removes the requirements to support S8-C and S8-U interfaces for Evolved Packet Core (EPC) to 5GC roaming. The disclosed architecture uses the 5G interface N16 (for control plane) and 5G interface N9 (for user plane) for roaming between EPC and 5GC.

The disclosed architecture removes inter-operators, inter-PLMN, or inter-vendor interfaces, which are very time-consuming to test. There is no need for testing one more S8 interface for inter-operability. Also, it is easier to use the legacy deployed LTE network, which will continue to be the main network for mobile network operators. In the disclosed architecture, charging data is only generated on one node, the visited session management function (vSMF). The serving gateway (SGW) does not need to generate charging information. The disclosed architecture provides operational efficiency for the Greenfield operator.

Figure 1B:
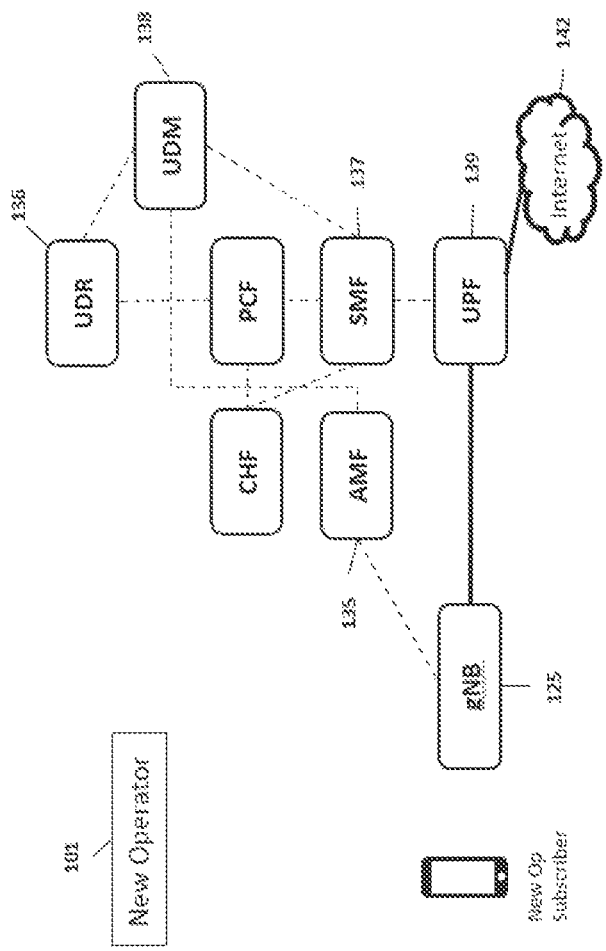
FIG. 1B illustrates an example Greenfield operator with 5G SA support in accordance with some aspects of the disclosed technology.
Figure 2:
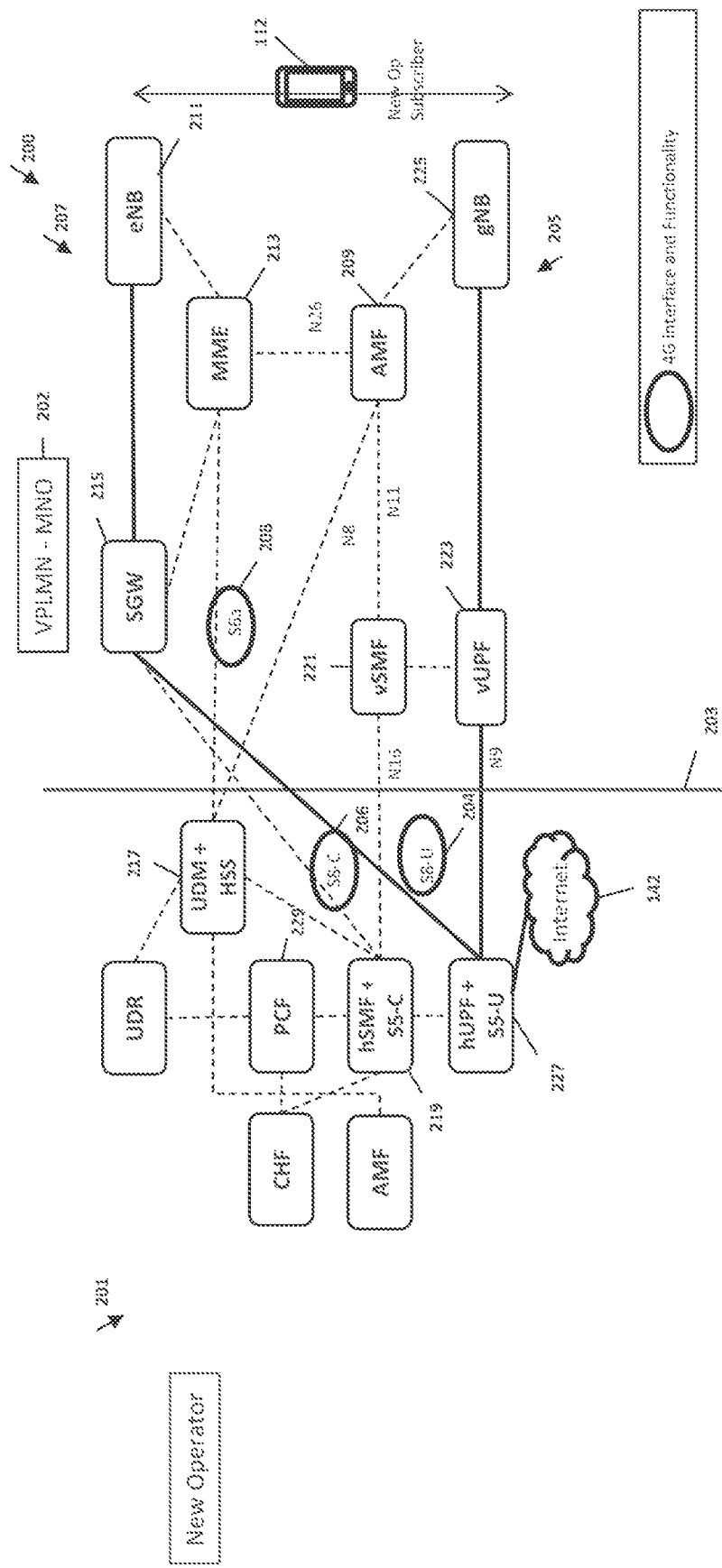
FIG. 2 is a diagram illustrating an example architecture with roaming between 4G and 5G using the 4G roaming interface of S8-C and S8-U (Prior art)
Figure 7:
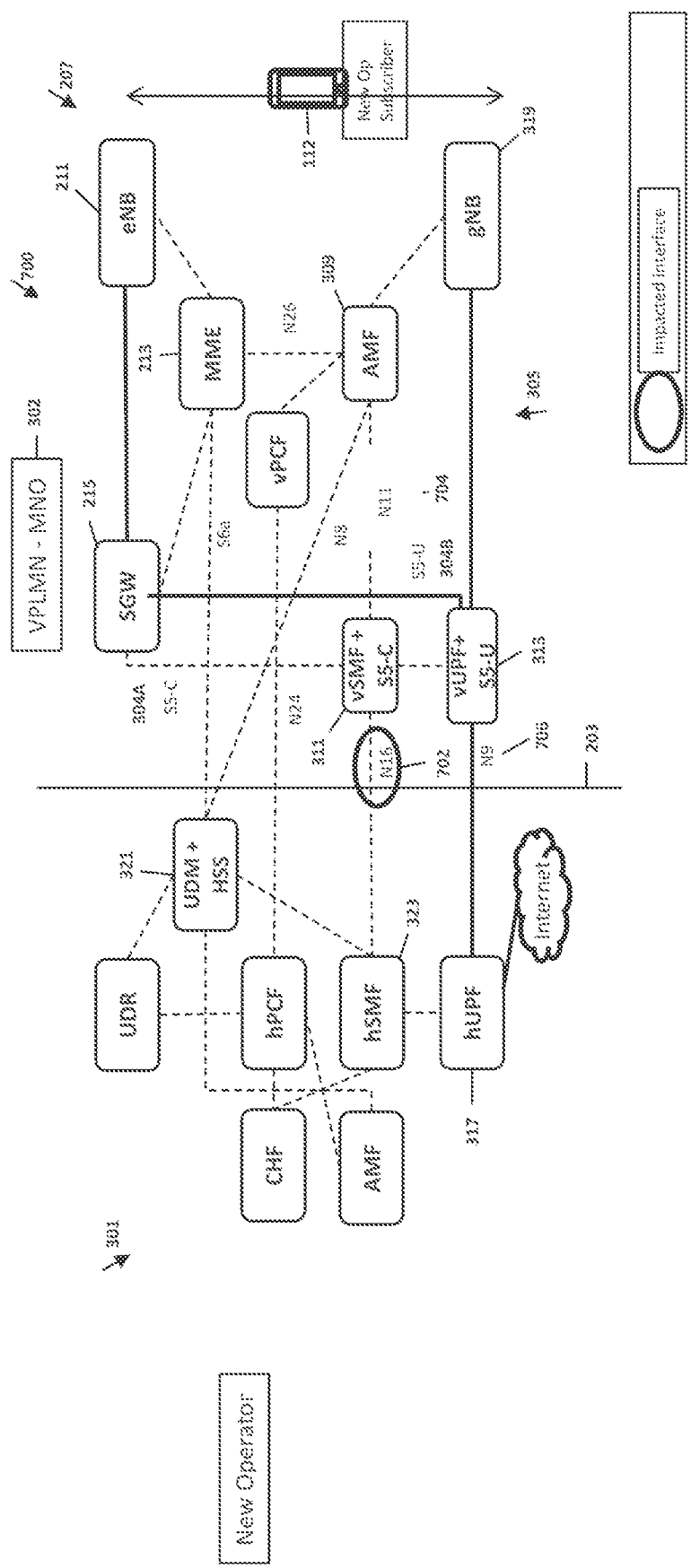
FIG. 7 is a diagram illustrating the example of home-routed architecture without any 4G roaming interface of S8-C and S8-U but having N16 interface impacted in accordance with some aspects of the disclosed technology.
Figure 8:
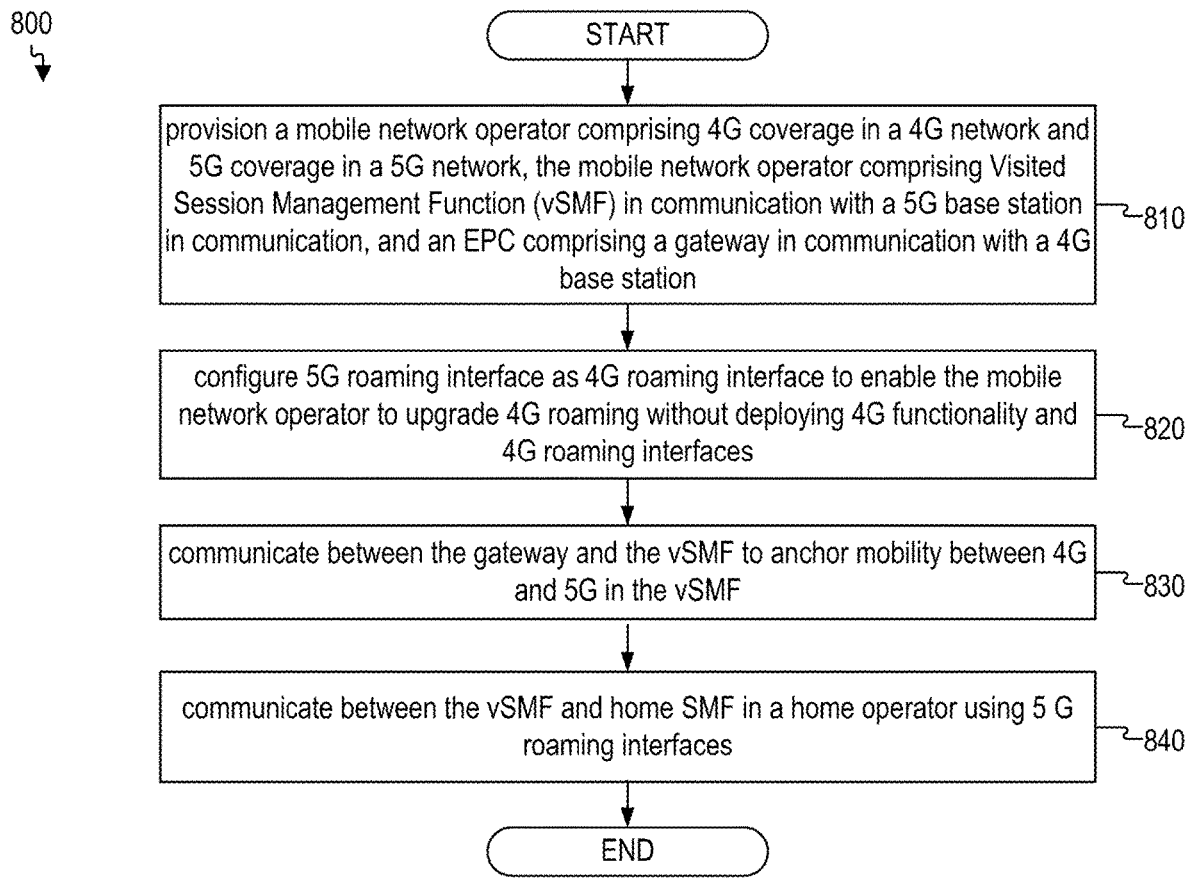
FIG. 8 is a flow chart illustrating the steps of roaming between Evolved Packet Core (EPC) and 5G core (5GC) in accordance with some aspects of the disclosed technology.
Figure 9:
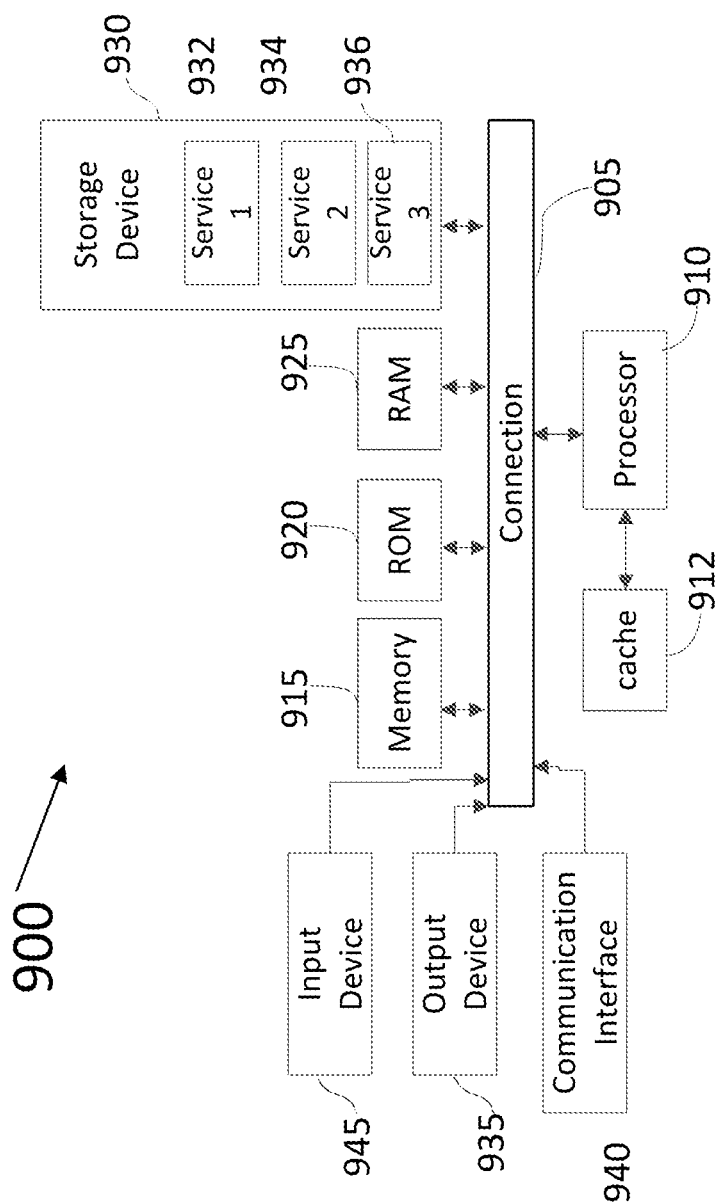
FIG. 9 shows an example of computing system in accordance with some aspects of the disclosed technology.

Descriptions of network environments and architectures for network data access and services, as illustrated in FIGS. 1A and 1B, are first disclosed herein. A discussion of roaming with 4G roaming interfaces, as shown in FIG. 2, defines the problem. A discussion of the disclosed architecture and solutions for roaming without additional 4G interfaces, as shown in FIGS. 3-7, will then follow. FIGS. 3-7 include various solutions for particular applications, including (1) home-routed, (2) home-routed, direct tunnel to eNB, when a UE is connected; (3) home-routed, when a UE is in an idle mode; (4) local break out existing; (5) interfaces impacted, respectively. A flow chart illustrating methods for roaming without additional 4G interfaces, as shown in FIG. 8, will then follow. The discussion then concludes with a brief description of example devices, as illustrated in FIG. 9. Several sequence diagrams, as shown in FIGS. 10-13, will then follow. These variations shall be described herein as the various embodiments are set forth. The disclosure now turns to FIG. 1A.

FIG. 1A depicts an exemplary schematic representation of a 5G network environment in which network slicing has been implemented, and in which one or more aspects of the present disclosure may operate, according to some aspects of the present disclosure.

As illustrated, network environment 100 is divided into four domains, each of which will be explained in greater depth below; a User Equipment (UE) domain 110, e.g., of one or more enterprises, in which a plurality of user cell-phones or other connected devices 112 reside; a Radio Access Network (RAN) domain 120, in which a plurality of radio cells, base stations, towers, or other radio infrastructure 122 resides; a Core Network 130, in which a plurality of Network Functions (NFs) 132, 134, . . . , n reside; and a Data Network 140, in which one or more data communication networks such as the Internet 142 reside. Additionally, the Data Network 140 can support SaaS providers configured to provide SaaSs to enterprises, e.g. to users in the UE domain 110.

Core Network 130 contains a plurality of Network Functions (NFs), shown here as NF 132, NF 134 . . . NF n. In some example embodiments, a core network 130 is a 5G core network (5GC) in accordance with one or more accepted 5GC architectures or designs. In some example embodiments, the core network 130 is an Evolved Packet Core (EPC) network, which combines aspects of the 5GC with existing LTE networks. Regardless of the particular design of core network 130, the plurality of NFs typically executes in a control plane of the core network 130, providing a service-based architecture in which a given NF allows any other authorized NFs to access its services. For example, a Session Management Function (SMF) controls session establishment, modification, release, etc., and in the course of doing so, provides other NFs with access to these constituent SMF services.

In some example embodiments, the plurality of NFs of the core network 130 can include one or more Access and Mobility Management Functions (AMF), typically used when core network 130 is a 5GC network) and Mobility Management Entities (MME), typically used when core network 130 is an EPC network), collectively referred to herein as an AMF/MME for purposes of simplicity and clarity. In some example embodiments, an AMF/MME can be common to or otherwise shared by multiple slices of the plurality of network slices 152, and in some example embodiments an AMF/MME can be unique to a single one of the plurality of network slices 152.

Similarly, the remaining NFs of the core network 130 can be shared amongst one or more network slices or provided as a unique instance specific to a single one of the plurality of network slices 152. In addition to NFs including an AMF/MME as discussed above, the plurality of NFs of the core network 130 can include one or more of the following: User Plane Functions (UPFs); Policy Control Functions (PCFs); Authentication Server Functions (AUSFs); Unified Data Management functions (UDMs); Application Functions (AFs); Network Exposure Functions (NEFs); NF Repository Functions (NRFs); and Network Slice Selection Functions (NSSFs). Various other NFs can be provided without departing from the scope of the present disclosure, as would be appreciated by one of ordinary skill in the art.

Across the four domains of the 5G network environment 100, an overall operator network domain 150 is defined. The operator network domain 150 is in some embodiments of a Public Land Mobile Network (PLMN), a private 5G network and/or a 5G enterprise network, and can be thought of as the carrier or business entity that provides cellular service to the end-users in UE domain 110. Within the operator network domain 150, a plurality of network slices 152 are created, defined, or otherwise provisioned to deliver the desired set of defined features and functionalities, e.g. SaaSs, for a certain use case or corresponding to other requirements or specifications. Note that network slicing for the plurality of network slices 152 is implemented in an end-to-end fashion, spanning multiple disparate technical and administrative domains, including management and orchestration planes (not shown). In other words, network slicing is performed from at least the enterprise or subscriber edge at UE domain 110, through the Radio Access Network (RAN) 120, through the 5G access edge and the 5G core network 130, and to the data network 140. Moreover, note that this network slicing may span multiple different 5G providers.

For example, as shown here, the plurality of network slices 152 include Slice 1, which corresponds to smartphone subscribers of the 5G provider who also operates the network domain, and Slice 2, which corresponds to smartphone subscribers of a virtual 5G provider leasing capacity from the actual operator of network domain 150. Also shown is Slice 3, which can be provided for a fleet of connected vehicles, and Slice 4, which can be provided for an IoT goods or container tracking system across a factory network or supply chain. Note that the network slices 152 are provided for purposes of illustration, and in accordance with the present disclosure, and the operator network domain 150 can implement any number of network slices as needed, and can implement these network slices for purposes, use cases, or subsets of users and user equipment in addition to those listed above. Specifically, the operator network domain 150 can implement any number of network slices for provisioning SaaSs from SaaS providers to one or more enterprises.

5G mobile and wireless networks will provide enhanced mobile broadband communications and are intended to deliver a wider range of services and applications as compared to all prior generation mobile and wireless networks. Compared to prior generations of mobile and wireless networks, the 5G network architecture is service-based, meaning that wherever suitable, architecture elements are defined as network functions that offer their services to other network functions via common framework interfaces. To support this wide range of services and network functions across an ever-growing base of user equipment (UE), 5G networks incorporate the network slicing concept utilized in previous generation architectures.

Within the scope of the 5G mobile and wireless network architecture, a network slice includes a set of defined features and functionalities that together form a complete Public Land Mobile Network (PLMN), a private 5G network, and/or a 5G enterprise network for providing services to UEs. This network slicing permits for the controlled composition of the 5G network with the specific network functions and provided services that are required for a specific usage scenario. In other words, network slicing enables a 5G network operator to deploy multiple, independent 5G networks where each is customized by instantiating only those features, capabilities, and services required to satisfy a given subset of the UEs or a related business customer needs.

In particular, network slicing is expected to play a critical role in 5G networks because of the multitude of use cases and new services 5G is capable of supporting. Network service provisioning through network slices is typically initiated when an enterprise requests network slices when registering with AMF/MME for a 5G network. At the time of registration, the enterprise will typically ask the AMF/MME for characteristics of network slices, such as slice bandwidth, slice latency, processing power, and slice resiliency associated with the network slices. These network slice characteristics can be used in ensuring that assigned network slices are capable of actually provisioning specific services, e.g. based on requirements of the services, to the enterprise.

Associating SaaSs and SaaS providers with network slices used to provide the SaaSs to enterprises can facilitate efficient management of SaaS provisioning to the enterprises. Specifically, it is desirable for an enterprise/subscriber to associate already procured SaaSs and SaaS providers with network slices being used to provision the SaaSs to the enterprise. However, associating SaaSs and SaaS providers with network slices is extremely difficult to achieve without federation across enterprises, network service providers, e.g. 5G service providers, and SaaS providers.

FIG. 1B illustrates an example operator with a stand alone 5G network. The operator 101 has a 5G network architecture. As addressed above, a User Equipment (UE) 112 can connect to a radio access network provided by a gNodeB (gNB) 125.

The gNB 125 can communicate over a control plane N2 interface with an access mobility function (AMF) 135. AMF 135 can handle tasks related to network access through communication with unified data management (UDM) function 138 which accesses a user data repository (URD) 136 that can contain user data such as profile information, authentication information, etc. Collectively AMF 135 and UDM 138 can determine whether a UE should have access and any parameters on access.

Assuming AMF 135 determines the UE 112 should have access to a user plane to provide voice or data communications, AMF 135 can select one or more service management functions (SMF) 137. SMF 137 can configure and control one or more user plane functions (UPF) 139. Control plane communications between the SMF 137 and the gNB 125 also need to be encrypted.

As noted above SMF 137 can configure and control one or more user plane functions (UPF) 139. SMF 137 communicates with UPF 139 over an N4 Interface which is a bridge between the control plane and the user plane. SMF 137 can send PDU session management and traffic steering and policy rules to UPF 139 over the N4 interface. UPF 139 can send PDU usage and event reporting to SMF 137 over the N4 interface.

UPF 139 can communicate user plane data or voice over the N3 interface back to UE 112 through gNB 127A. There can be any number of UPFs handling different user plane services. Most commonly there would be at least one UPF for data service and at least one UPF for voice service.

By implementing UPF at each gNB, many UPF instances are in a single deployment, which complicates the UE IP address management and user plane data forwarding. Typically, a UE IP address pool is maintained by SMF, which allocates an IP address to a UE during UE Registration/PDU (Protocol Data Unit) session establishment process. SMF then configures UPF with traffic classification rules and traffic policies for the IP address. UPF acts as a router for the subnet allocated to the UE. IGP/BGP protocols can be used to publish these routes into the network. When the traffic for the UE is received from the network, the traffic is classified and the IP payload alone is forwarded to the gNB where the UE is connected over a GTPu tunnel. Similarly, when data are received in an uplink over the GTPu tunnel, UPF appends a MAC header and routes the data to the next hop. In the context of local UPF collocated at a gNB, maintaining one UE IP address pool per gNB will not be scalable and manageable as multiple gNBs exist in a facility. Routing/Packet forwarding would have similar implications.

FIG. 2 is a diagram illustrating an example architecture 200 with roaming between LTE and 5G using additional LTE roaming interfaces of S8-C and S8-U in accordance with some aspects of the disclosed technology. As illustrated in FIG. 2, a mobile network operator (MNO) 202 as a visited public land mobile network (VPLMN) is on the right side of a vertical line 203, while the operator 201 is on the left side of vertical line 203. The MNO 202 may include both LTE network 207 and 5G network 205 in local regions where the UE is. Within the MNO 202, the user or UE 112 can roam between the LTE network and the 5G network.

The 5G network 205 may include Visited Session Management Function (vSMF) 221, Access & Mobility Management Function (AMF) 221, and gNodeB (gNB) 225. The gNB 225 is a 5G base station, which is in communication with the AMF 209, which is connected to vSMF 221. The gNB 225 is also in communication with vUPF 223.

The LTE network or EPC 207 may include Serving Gateway (SGW) 215, Mobile Management Entity (MME) 213, and eNodeB (eNB) 211. The eNB 211 is a 4G base station in communication with the SGW 215 and the MME 213. The SGW 215 is a gateway and serves as the local mobility anchor for inter-eNodeB handover and mobility between 3GPP networks, and can route and forward user data packets. MME 213 is responsible for initiating paging and authentication of the mobile device. MME 213 retains location information at the tracking area level for the UE 112 and then selects the appropriate gateway or SGW 215 during the initial registration process. MME 213 connects to the eNB 211 through the S1-MME interface and connects to SGW through the S11 interface. $ The home operator 201 may include home UPF (hUPF)+S5-U 227, hSMF+S5-C 219, Policy Control Function (PCF) 229, and Unified Data Management and Home Subscriber Service (UDM+HSS) 217 outside the MNO 202 or to the left side of line 203. The hUPF+S5-U indicates that the hUPF is modified to also support the interface S5-U. Likewise, the hSMF+S5-C indicates that the hSMF is modified to also support the interface S5-C. The UDM+HSS indicates that the UDM is modified to include the HSS functionality. S8 is the "roaming version" of S5. Functionally, S8 and S5 are the same. Only for the roaming, S5 may be replaced with S8, which may not be required.

As illustrated in FIG. 2, the 3GPP architecture 200 supports 4G interface S6a for authentication from MME. Also, the 3GPP architecture 200 supports 4G roaming interface S8-C for the control plane (CP) and 4G roaming interface S8-U for the user plane (UP). The S-8 interfaces are between SGW 215 and hSMF+S5-C 219 or hUPF+S5-U 227, respectively. The S8 interfaces including S8-C and S8-U are inter-operator interfaces. The S8 interfaces may also be inter-vendor interfaces. Though these S-8 interfaces are specified in 3GPP specifications, the S-8 interfaces require extensive interoperability testing. Also, the S8 interfaces are part of legacy roaming which the 5G standa alone operators do not support. Architecture 200 also includes interface S6a or interface 208 between UDM+HSS 217 and MME 213.

Figure 3:
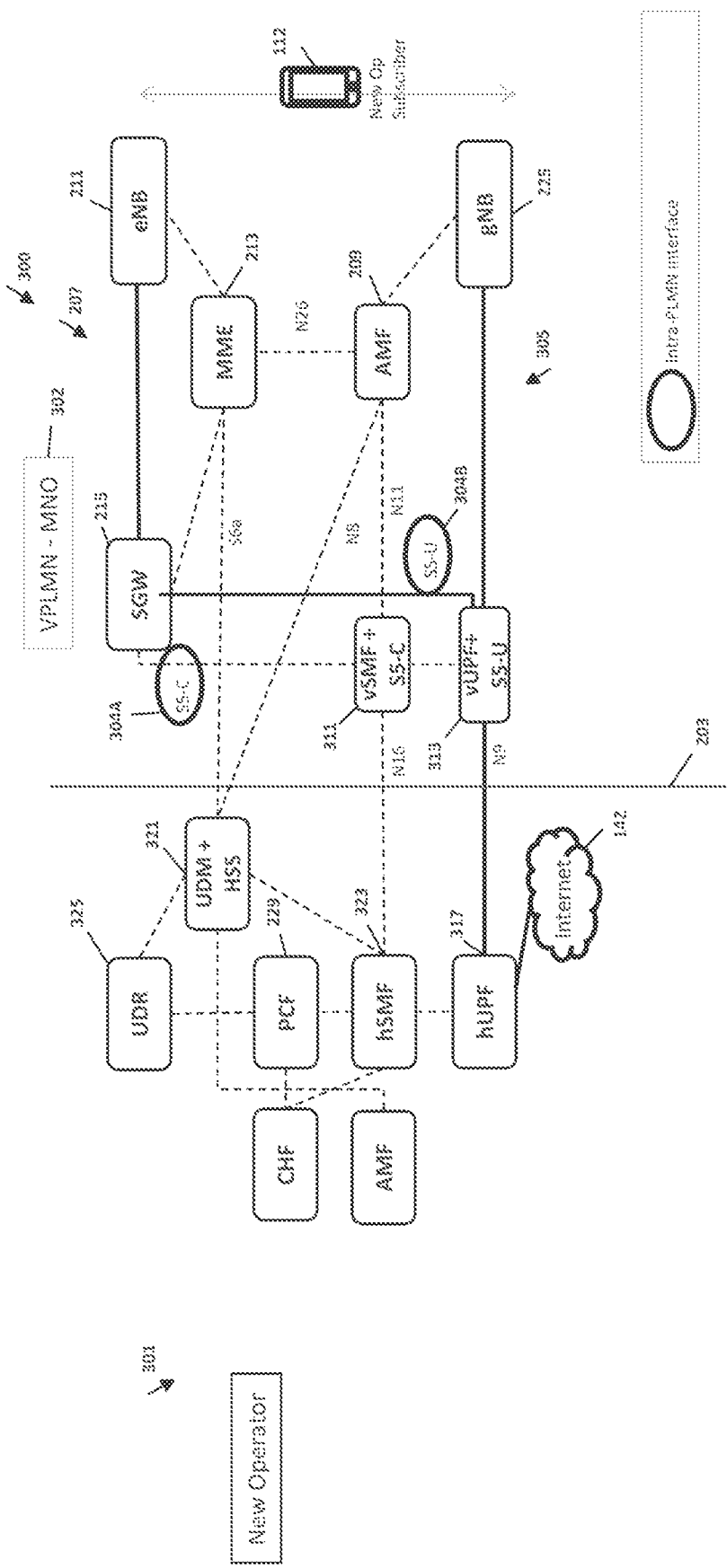
FIG. 3 is a diagram illustrating an example of home-routed architecture with roaming between 4G and 5G without any 4G roaming interface of S8-C and S8-U in accordance with some aspects of the disclosed technology.

FIG. 3 is a diagram illustrating an example of home-routed architecture with roaming between 4G and 5G without any 4G roaming interfaces of S8-C and S8-U in accordance with some aspects of the disclosed technology. As illustrated in FIG. 3, a home-routed architecture 300 removes the 4G roaming interface S8-C and S8-U of the architecture 200. The UE 112 is in the MNO 302 and can use both the EPC and 5GC by roaming between the EPC 207 and 5GC 305.

The home-routed architecture 300 uses S5 interfaces between the SGW 215 and the vSMF 311 to anchor mobility between 4G and 5G in the vSMF 311. Specifically, S5-C or interface 304A is used between SGW 215 and vSMF+S5-C 311, and S5-U or interface 304B is used between SGW 215 and vUPF+S5-U 313. The vUPF+S5-U 313 indicates that the vUPF is modified to also support the interface S5-U. Likewise, the vSMF+S5-C 311 indicates that the vSMF is modified to also support the interface S5-C.

The home-routed architecture 300 configures 5G roaming N9 and N16 interfaces as 4G roaming interfaces to enable the MNOs to upgrade 4G roaming without deploying 4G functionality and 4G roaming interfaces. The home-routed architecture 300 may also enable the EPC and 5GC to interwork for home-routed roaming without using 4G roaming interfaces S8-U and S8-C.

The 5G network 305 may also include and visited user plane function (vUPF) 313 and vSMF 311. The 5G network 305 may include the vSMF plus Packet Network Data Gateway-Control (PGW-C) (vSMF+PGW-C) capability. The home-routed architecture 300 may select the SGW 215 and the vSMF+PGW-C 311 by the MME using the Domain Name System(DNS).

The 5G network 305 may also include vSMF+S5-C capability indication in Network Repository Function (NRF) to enable the AMF 309 to select the vSMF 311. The vSMF 311 has a few functions. The vSMF 311 or MME 213 may select the hSMF 315. The vSMF 311 may also create a roaming charge records when the UE 112 is in the EPC or the 5G network.

The home operator or Greenfield operator 301 may include hSMF 323, and hUPF 317, PCF 229, and UDM+HSS 321. hSMF 323 is different from hSMF+S5-C 219, as in architecture 200. Also, hUPF 317 is different from hUPF+S5-C 227 as in architecture 200. The architecture illustrated in FIG. 3 requires no modifications to the hSMF 323 and the hUPF 317 as compared to the architecture illustrated in FIG. 2.

The home-routed architecture 300 also handles 4G to 5G handovers in the MNO or VPLMN 302. The home-routed architecture 300 may support the handovers without the N26 interface by using the hSMF to register the vSMF as an anchor in the UDM+HSS.

The home-routed architecture 300 may form an N9 tunnel from the hUPF 317 to the vUPF 313 for forwarding indirect data. The home-routed architecture 300 may also form an S5 tunnel from the vUPF 313 to the SGW 215. The home-routed architecture 300 may forward the indirect data from the hUPF during handover between 4G and 5G using the S5 tunnel in the MNO or VPLMN 302.

When the UE 112 connects to the eNB 211 in the VPLMN 302, the UE 112 may go through the SGW 215 to connect to vSMF 311 and vUPF 313 through intra-PLMN interfaces S5-C and S5-U, respectively, which communicate with hSMF 315 and hUPF 317, respectively.

When the UE 112 connects to the gNB 225 in the VPLMN 302, the UE 112 may register with the AMF 209. The AMF 209 may query the Network Repository Function (NRF), which serves as a visited-NRF (V-NRF), and the V-NRF may query the home-NRF (H-NRF) to find the Authentication Server Function (AUSF) and the Unified Data Management (UDM) 321 in the home operator or operator 301.

The disclosed architecture, e.g. home-routed architecture 300, provides several benefits. First, the Greenfield operator does not need to support a 4G roaming interface. The 4G functionality of "S5-C" in SMF+S5-C and S5-U in UPF+S5-U is moved to the visited operator or VPLMN, which, in most cases, is a mobile network operator and supports the 4G functionality.

Also, the disclosed architecture provides lower latency 4G inter SGW handover. All handovers between 4G and 5G in the visited operator, VPLMN, or MNO are handled in the visited operator, VPLMN, or MNO itself, such that the disclosed architecture provides faster handover than the conventional 3GPP architecture 200, since the anchor of the 4G and 5G mobility is in the vSMF, but is not in the hSMF. Signaling may occur between the vSMF and hSMF through the N16 interface, while tunnel movement may happen in the VPLMN.

Also, roaming charging data generation is done on a single node, e.g. the vSMF node, irrespective of whether the UE 112 is in the LTE network or 5G network. The roaming-charging functionality of SGW may not be needed and can be replaced by the charging functionality in the vSMF, e.g. vSMF+S5-C and vSMF+S5-U.

In the disclosed architecture, there may be additional hops in the user plane (UP) as compared to the architecture in FIG. 2, for example, hops among eNB, SGW-U, UPF, or hUPF. Also, there may be additional hops in the control plane (CP) S8-C and S8-U interfaces, for example, hops among MME, SGW, vSMF, or hSMF.

Figure 4:
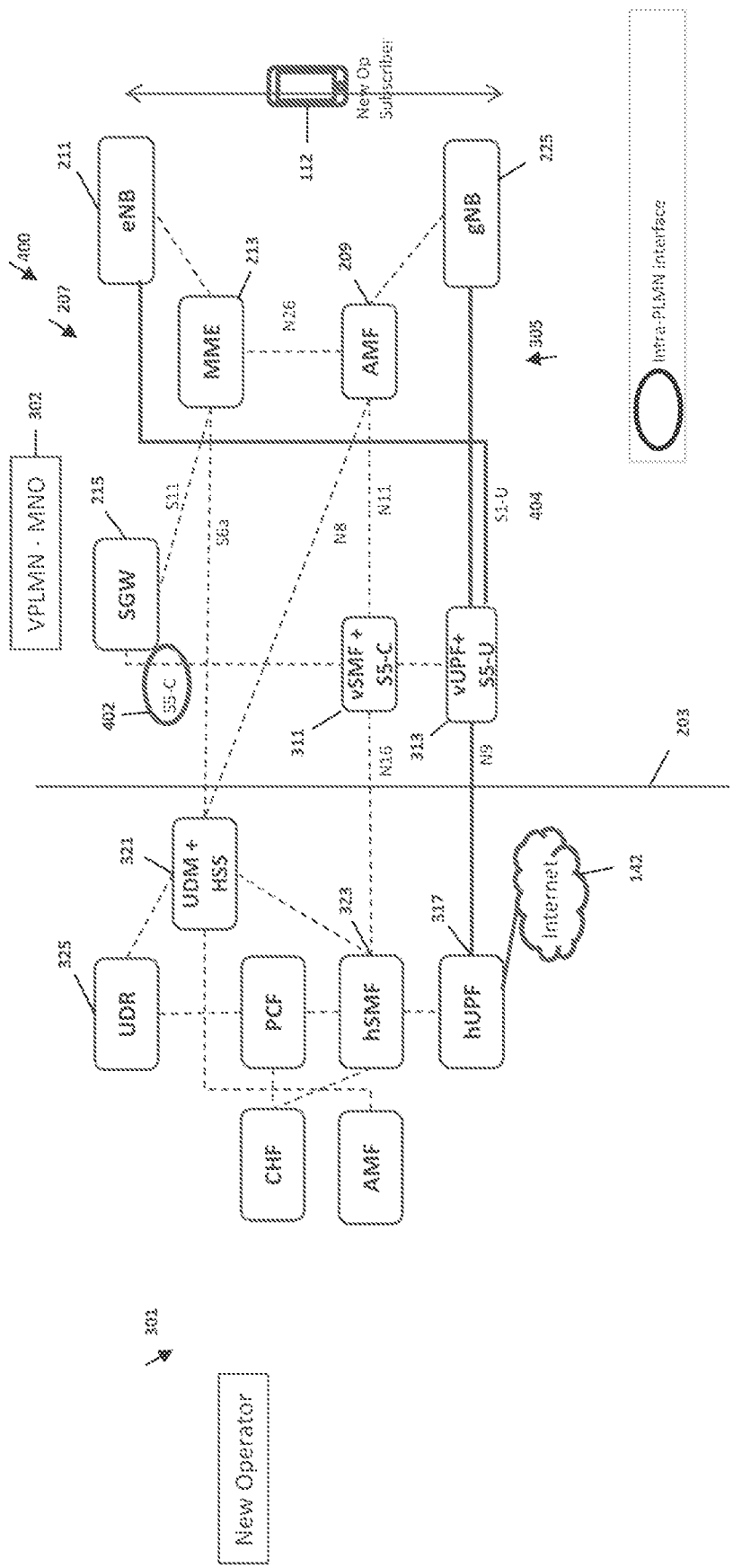
FIG. 4 is a diagram illustrating an example of home-routed architecture having a direct tunnel to eNB without any 4G roaming interface of S8-C and S8-U in accordance with some aspects of the disclosed technology.
Figure 5:
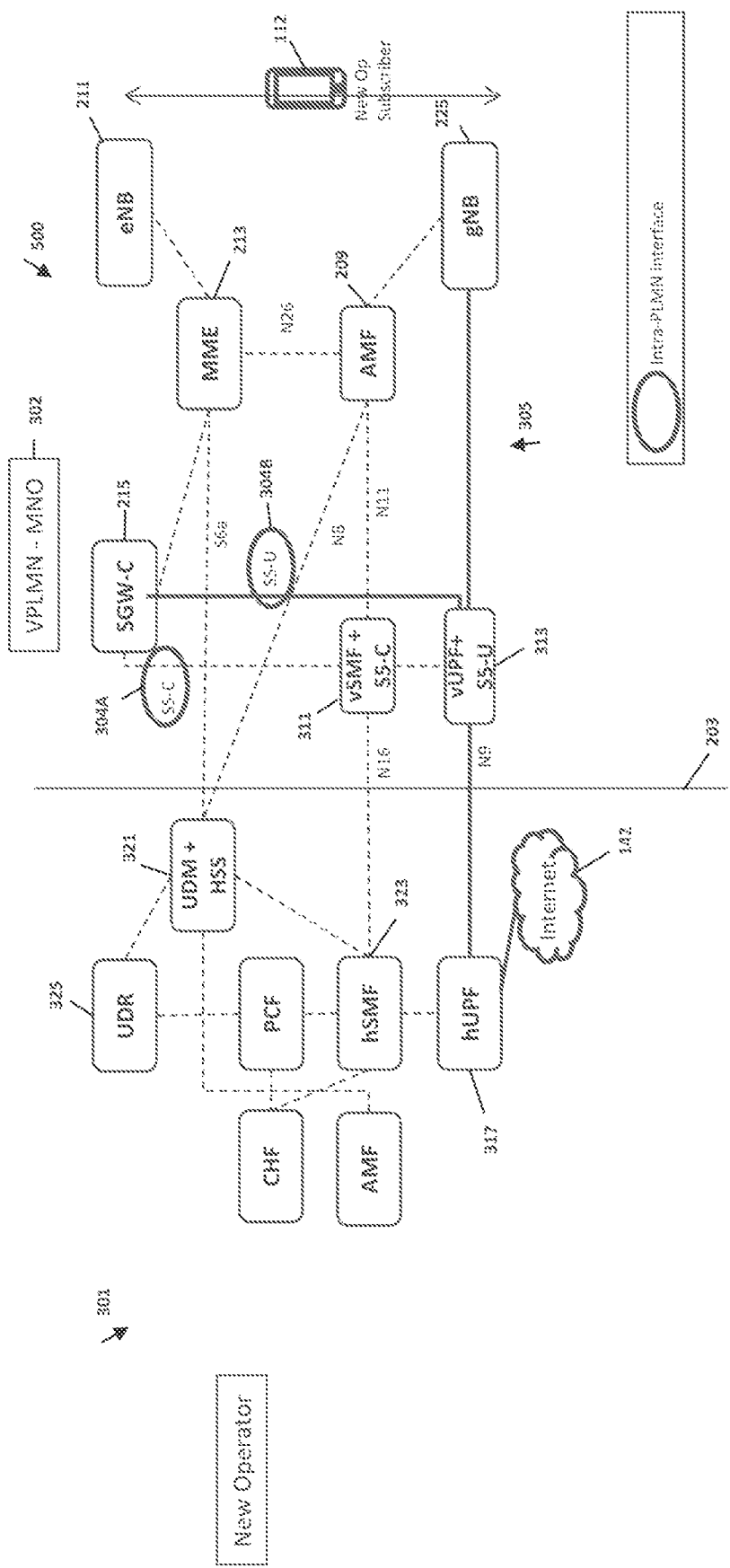
FIG. 5 is a diagram illustrating an example of home-routed architecture when a UE is in an idle mode without any 4G roaming interface of S8-C and S8-U in accordance with some aspects of the disclosed technology.
Figure 6:
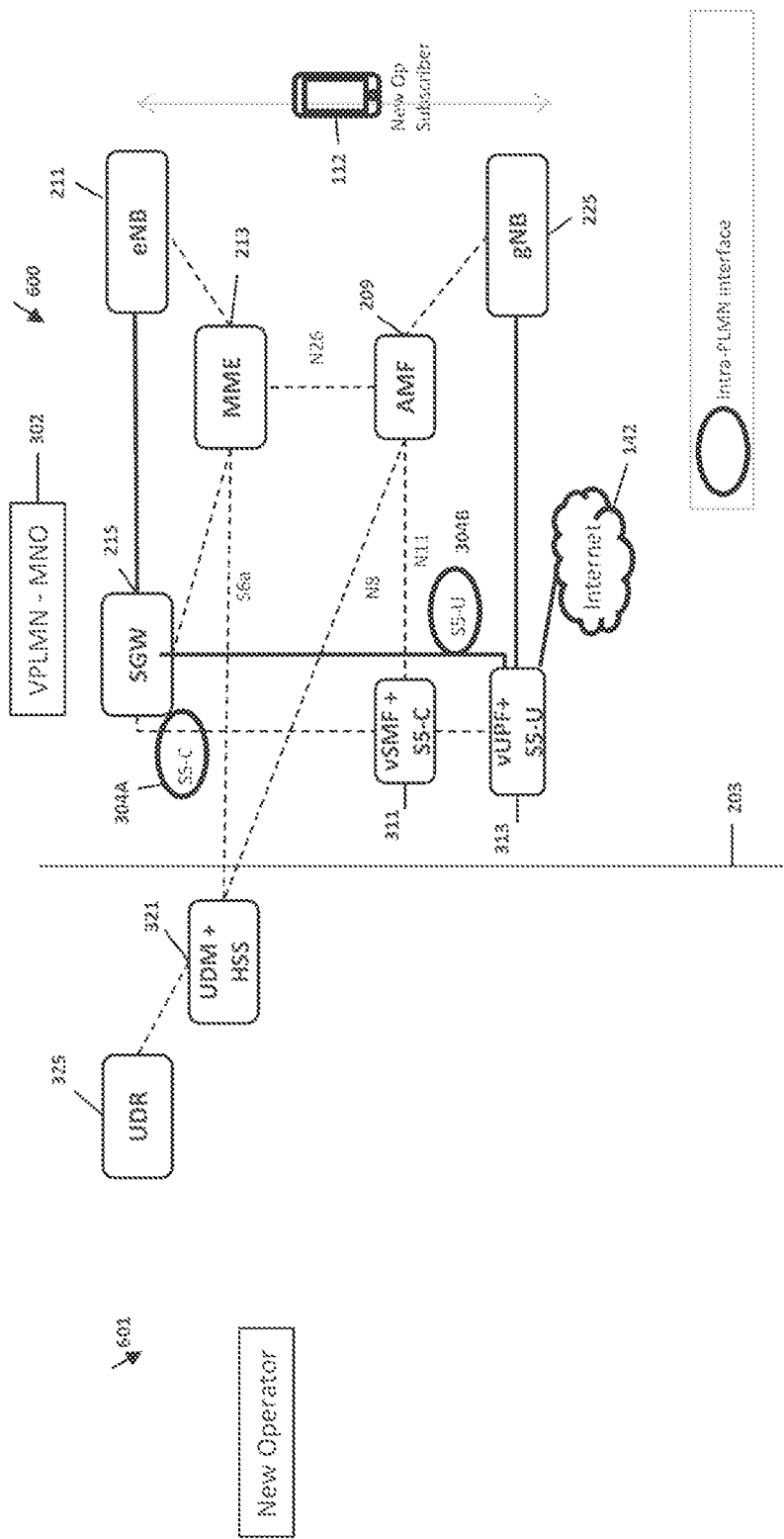
FIG. 6 is a diagram illustrating an example of local breakout architecture without any 4G roaming interface of S8-C and S8-U in accordance with some aspects of the disclosed technology.

FIGS. 4-6 provide architectures that are variations from FIG. 3.

FIG. 4 is a diagram illustrating an example home-routed architecture having a direct tunnel to eNB without any 4G roaming interface of S8-C and S8-U in accordance with some aspects of the disclosed technology. As illustrated in FIG. 4, the home-routed architecture 400 does not have the interface S5-U between the vUPF+S5-U 313 and SGW 215. The home-routed architecture 400 does not have the interface between SGW 215 and eNB 211, compared to the architecture 300. Instead, the vUPF+S5-U 313 has a direct tunnel to eNB 211 and communicates with eNB 211 directly through interface S1-U. The S5-C is an intra-PLMN interface.

FIG. 5 is a diagram illustrating an example of home-routed architecture when a UE is in an idle mode without any 4G roaming interface of S8-C and S8-U in accordance with some aspects of the disclosed technology. A home-routed architecture 500 does not have any 4G roaming interface of S8-C and S8-U like the architecture 200 as shown in FIG. 2. The architecture 500 is similar to the architecture 300 except this architecture does not have any connection between SGW 215 and eNB 211. The architecture 500 is used when UE 112 is in an idle mode.

FIG. 6 is a diagram illustrating an example of local breakout architecture without any 4G roaming interface of S8-C and S8-U in accordance with some aspects of the disclosed technology. A local breakout architecture 600 is similar to architecture 300 except this architecture 600 does not have hSMF, and also does not include interfaces N9 and N16. In the local breakout architecture 600, the internet 142 is to the right side of line 203 and near the vUPF+S5-C 313. The home operator 601 includes UDM+HSS 321 and UDR 325. The local breakout architecture 600 uses interface S5-C for communications between SGW 215 and vSMF+S5-C 311. The local breakout architecture 600 uses interface S5-U for communication between SGW 215 and vUPF+S5-U 313.

Table 1 lists a summary of vSMF and hSMF functionality for access via EPC. vSMF and hSMF has split functionalities. As shown in Table 1,. vSMF also selects hSMF. vSMF also creates roaming charging records while SGW does not handle any roaming charging record creation. The vSMF has roaming user-plane security while SGW does not have roaming user-plane security. Also, SM NAS message handling functionality is not performed by vSMF when with EPC, but is performed by vSMF when with 5GC.

In contrast, hSMF has the IP@ allocation functionality. hSMF also does PCO generation. hSMF also has roaming user-plane security. hSMF does the 5G to 4G QoS mapping.

TABLE 1

| Functionality | SGW | vSMF | hSMF | vUPF |
|---|---|---|---|---|
| IP @ allocation | | | Yes | |
| 5G to 4G QoS mapping | | | Yes | |
| hSMF selection | | Yes | | |
| Roaming charging records | No | Yes | Yes | |
| Roaming user-plane security | No | Yes | | |
| 5G single GTP-U to or from multiple 4G-GTP-U | | | | Yes |
| PCO generation | | | Yes | |
| SM NAS message handling | | No | | |

Also, vUPF provides the 5G single GTP-U to or from multiple 4G-GTP-U functionalities, which is used for indirect data by the hUPF during the 4G to 5G handover. The N9 tunnel to the vUPF has the 5G GTP-U tunneling (one TEID with multiple 5QI flows). The S5 tunnel from vUPF to SGW has one TEID per QoS flow.

In some aspects, the N16 interface between the vSMF and the hSMF may be modified. FIG. 7 is a diagram illustrating the example of home-routed architecture without any 4G roaming interface of S8-C and S8-U but having N16 interface impacted in accordance with some aspects of the disclosed technology. The architecture 300 does not impact the legacy NFs including SGW or MME) and legacy interfaces (e.g. S5-C) and also may have some impacts on interface N16. As illustrated, interface N16 between hSMF and vSMF+S5-C may be impacted. Modification to the interface N16 may be needed. The N16 interface is modified from vSMF to hSMF to carry indication that the UE is attached via LTE network, hence 4G QoS information is needed. Also, the N16 interface is modified from hSMF to vSMF to carry 4G QoS data if UE is attached via LTE.

However, other interfaces, such as interface N9, may not change.

FIG. 8 illustrates an example method 800 for roaming between Evolved Packet Core (EPC) and 5G core (5GC). Although the example method 800 depicts a particular sequence of operations, the sequence may be altered without departing from the scope of the present disclosure. For example, some of the operations depicted may be performed in parallel or in a different sequence that does not materially affect the function of the method 800. In other examples, different components of an example device or system that implements the method 800 may perform functions at substantially the same time or in a specific sequence.

According to some examples, method 800 may include provisioning a mobile network operator including 4G coverage in a LTE network and 5G coverage in a 5G network, the mobile network operator including Visited Session Management Function (vSMF) in communication with a 5G base station in communication, and an EPC including a gateway in communication with a 4G base station at block 810. For example, the architecture 300, 400, 500, or 600 as illustrated in FIGS. 3-6 provide a mobile network operator including 4G coverage in a 4G network and 5G coverage in a 5G network.

In some aspects, method 800 is provided for deploying 5G core functionality in a 5G network. Method 800 may use 5G interfaces in the 5G network to enable mobile network operators (MNOs) to upgrade 4G/3G/2G roaming without deploying 4G functionality and 4G interfaces (e.g. 4G roaming interfaces S8-U and S8-C).

In some aspects, the 5G network comprises the visited user plane function (vUPF). The 5G network may include home SMF (hSMF), Policy Control Function (PCF), and Unified Data Management and Home Subscriber Service (UDM+HSS).

In some aspects, the 5G network may include the vSMF plus Packet Network Data Gateway-Control (PGW-C) (vSMF+PGW-C) capability.

In some aspects, the 5G network may include vSMF+S5-C capability indication in Network Repository Function (NRF) to enable Access and Mobility Management Functions (AMF) to select the vSMF.

According to some examples, method 800 may include configuring a 5G roaming interface as a 4G roaming interface to enable the mobile network operator to upgrade 4G roaming without deploying 4G functionality and 4G roaming interfaces at block 820. For example, the architecture 300, 400, 500, or 600 as illustrated in FIGS. 3-6 may configure the 5G roaming interface as a 4G roaming interface to enable the mobile network operator to upgrade 4G roaming without deploying 4G functionality and 4G roaming interfaces (e.g interfaces S8-C and S8-U).

In some aspects, the 5G roaming interface may include N9 and N16 interfaces.

In some aspects, the N16 interface between the vSMF and the hSMF may be modified.

In some aspects, the EPC and 5GC may be enabled to interwork for home-routed roaming without using S8-U and S8-C roaming interfaces.

According to some examples, method 800 may include communicating between the gateway and the vSMF to anchor mobility between 4G and 5G in the vSMF at block 830. For example, the interfaces S5-U and S5-C as illustrated in FIGS. 3, 4-6 may communicate between the gateway and the vSMF to anchor mobility between 4G and 5G in the vSMF.

In some aspects, method 800 may include selecting the gateway and the vSMF+PGW-C by Mobile Management Entity (MME) using Domain Name System DNS).

In some aspects, the disclosed architecture includes vSMF+S5-C capability indication in NRF, which enables AMF to select the vSMF. This can be an indication of 4gN9Hr, which indicates 4G N9 home routed.

In some aspects, MME uses the "x-3gpp-pgw:x-n9-sbi" service parameter in DNS records for the selection of vSMF+PGW-C.

In some aspects, the disclosed architecture includes an indication of 4gN9Hr to SGW from MME, for handling things, such as no roaming charging generation.

In some aspects, the vSMF is selected by MME.

In some aspects, the hSMF may be selected by MME or vSMF. The hSMF selection may use NRF. The hSMF may be selected by the MME as an anchor PGW-C, i.e. using DNS mechanisms. In some aspects, using NRF for the hSMF selection would make the hSMF selection homogenous between 5G and 4G, i.e. both using NRF.

In some aspects, the MME may select the hSMF. Most inter-operator selection policies are in MME, so the hSMF selection may be done by MME. The MME may also do the hSMF selection for S8 roaming. The vSMF selection may also be added to the MME. The vSMF selection can use the new tag "+n9" protocol support. The MME selects SGW, vSMF, and hSMF. The MME provides both vSMF and hSMF to the SGW. The SGW uses the vSMF for selection and connects to the vSMF, but may provide the hSMF to the vSMF as part of the existing PGW-C address field.

In some aspects, the vSMF may select the hSMF. For example, the MME may select vSMF. This can even be faked by the DNS, i.e. when the MME does hPGW-C selection, the returned result is vSMF. Alternatively, the MME may look for the vSMF selection instead of hPGW-C for this HPLMN. A new tag "+n9" can be used for vSMF+PGW-C selection. The MME provides the selected vSMF as PGW-C to the SGW. There can be a flag to the SGW to pass on transparently to the vSMF for the 4gN9HR situation. The vSMF, on receiving the flag, may do the hSMF selection using NRF. The flag from the MME may be provided to the hSMF, indicating that this is a 4gN9Hr situation. The flag may not be needed, since the vSMF when supporting vSMF+PGW-C functionality may know that this is a 4gN9HR situation.

The selection of hSMF by vSMF may be a better one for at least the following reasons. First, the selection uses the NRF based hSMF selection which is the same as for 5gN9Hr. Second, there may be lesser impacts on MME and SGW. The vSMF selecting hSMF can be implemented without impact on MME and SGW with DNS based updates.

In some aspects, method 800 may include mapping from 5G quality of Service (QoS) created by the hSMF from Policy and Charging Control (PCC) rules from the PCF, by the hSMF, to 4G QoS. Method 800 may also include creating a roaming charge record, by the vSMF, when a UE is in the EPC or the 5G network.

According to some examples, method 800 may include communicating between the vSMF and home SMF in a home operator using 5G roaming interfaces at block 840. For example, the interfaces N9 and N16 as illustrated in FIGS. 3-5 may communicate between the vSMF and home SMF in a home operator using 5G roaming interfaces.

In some aspects, the home operator may include the home user plane function (hUPF).

In some aspects, the disclosed architecture includes indication of 4gN9Hr from vSMF to hSMF. The indication can be either explicit or implicit.

In some aspects, indication to vSMF to route to hSMF may be needed.

In some aspects, indication to hSMF that the session is EPC N9 home-routed roamed (EpcN9Hr roamed) can be implicit or explicit.

FIG. 9 shows an example of computing system 900, which can be for example any computing device making up any of the entities illustrated in FIG. 2, for example, SGW 215 or vSMF 311, or any component thereof in which the components of the system are in communication with each other using connection 905. Connection 905 can be a physical connection via a bus, or a direct connection into processor 910, such as in a chipset architecture. Connection 905 can also be a virtual, networked connection, or logical connection.

In some embodiments, computing system 900 is a distributed system in which the functions described in this disclosure can be distributed within a data center, multiple data centers, a peer network, etc. In some embodiments, one or more of the described system components represents many such components each performing some or all of the function for which the component is described. In some embodiments, the components can be physical or virtual devices.

An example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache of high-speed memory 912 connected directly with, close to, or integrated as part of processor 910.

Processor 910 can include any general-purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of many output mechanisms known to those of skill in the art. In some instances, multimodal systems can enable a user to provide multiple types of input/output to communicate with computing system 900. Computing system 900 can include communications interface 940, which can generally govern and manage the user input and system output. There is no restriction on operating on any particular hardware arrangement, and therefore the basic features here may easily be substituted for improved hardware or firmware arrangements as they are developed.

Storage device 930 can be a non-volatile memory device and can be a hard disk or other types of computer-readable media which can store data that are accessible by a computer, such as magnetic cassettes, flash memory cards, solid-state memory devices, digital versatile disks, cartridges, random access memories (RAMs), read-only memory (ROM), and/or some combination of these devices.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

For clarity of explanation, in some instances, the present technology may be presented as including individual functional blocks including functional blocks including devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in the memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bitstream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Examples

The method for starting on 4G includes attaching on 4G+PDN Connection creation on 4G, as illustrated in FIG. 10. The method may also include using Bearer Modification Procedures and Extra hop in all 4G procedures involving PGW. The method may also include handover from 4G to 5G with N26, and handover from 4G to 5G without N26 interface (e.g. "handover attach" scenario) in FIGS. 11A-B.

Figure 10A:
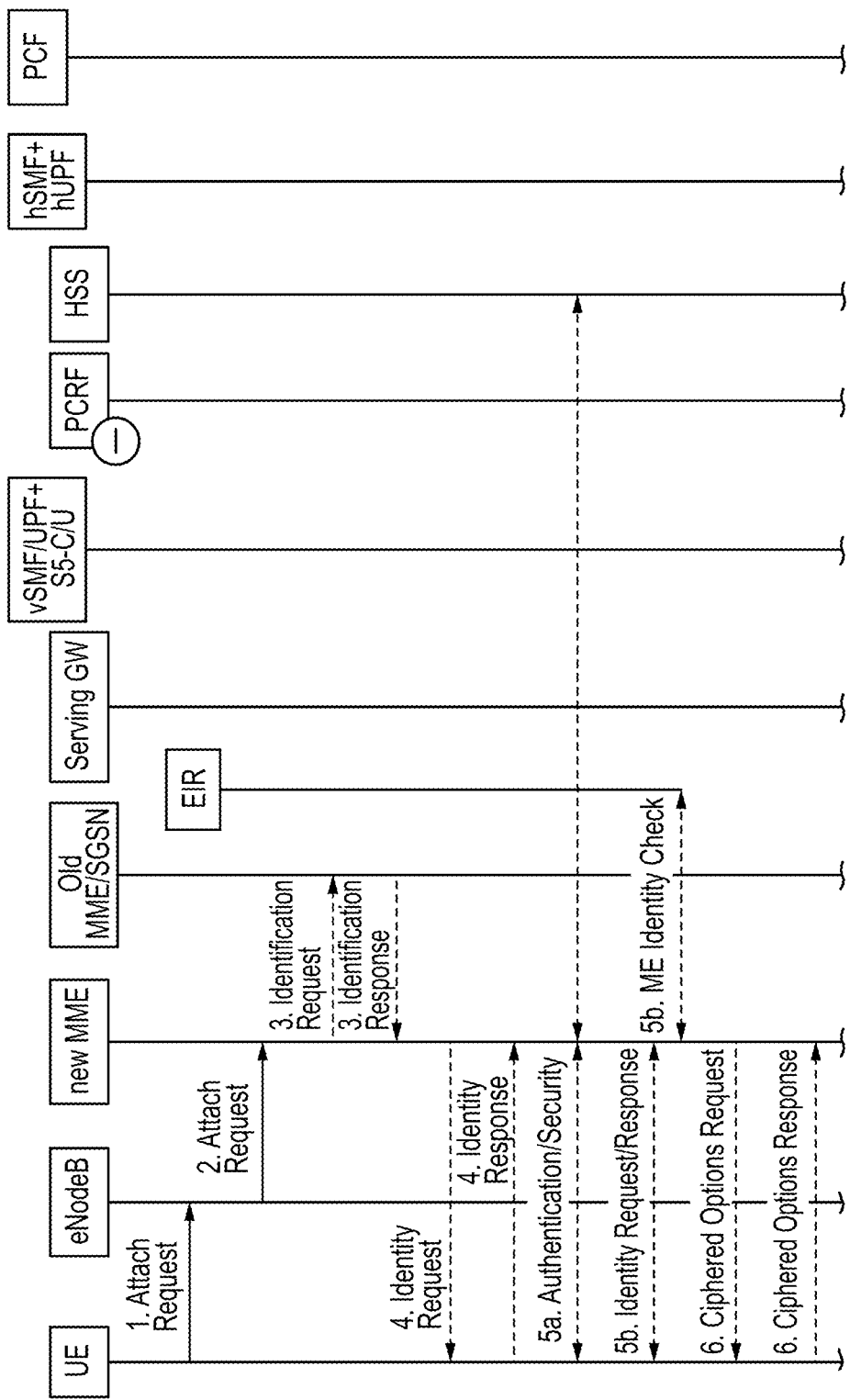
FIG. 10A is a a first part of a sequence diagram illustrating 4G attach in accordance with some aspects of the disclosed technology.
Figure 10C:
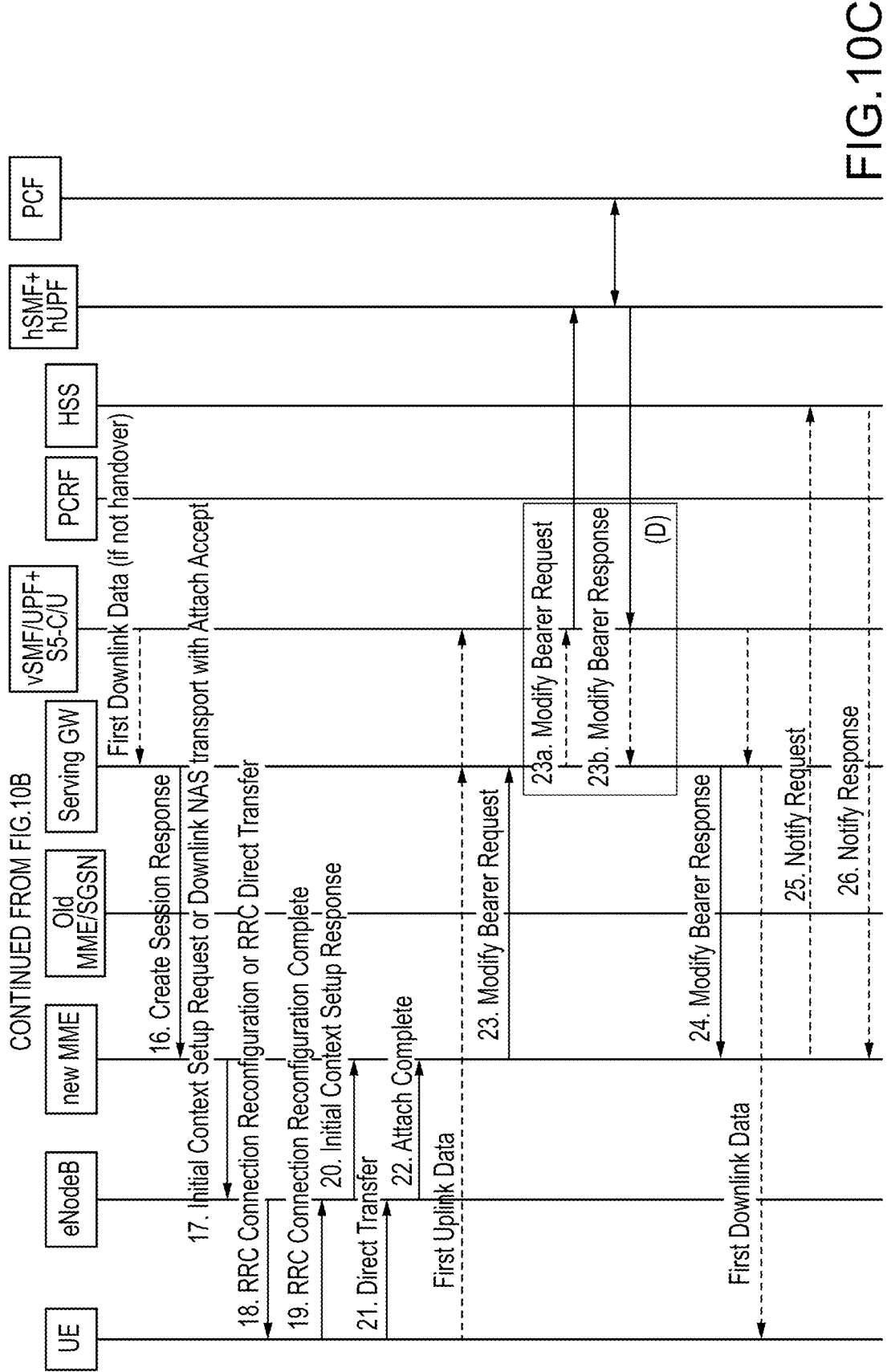
FIG. 10C is a third part of the sequence diagram illustrating 4G attach in accordance with some aspects of the disclosed technology.

FIGS. 10A-C are an example sequence diagram illustrating 4G attach including communications among user equipment (UE), eNB, new MME, oldMME/SGSN, serving GW, EIR, vSMF/UPF+S5-C/U, PCRF, HSS, h5MF+hUPF, and PCF. New steps include step 7a (delete PDU session) from vSMF+UPF+S5-C/U to hSMF+hUPF, step 7b (PCF interaction) between hSMF+hUPF and PCF, and step 7c (acknowledgement) from hSMF+hUPF to vSMF+UPF+S5-C/U. New steps also include step step 10a (delete PDU session) from vSMF+UPF+S5-C/U to hSMF+hUPF, step 10b (PCF interaction) between hSMF+hUPF and PCF, and step 10c (acknowledgement) from hSMF+hUPF to vSMF+UPF+S5-C/U.

New steps also include step 13a (post NSMF-pdu-session/pdu-session) from vSMF+UPF+S5-C/U to hSMF+hUPF. The vSMF selects hSMF, which needs vNRF->hNRF interaction. This is new functionality in the vSMF. Any "Local policy" for selection of hSMF in home operator which was in MME now needs to be in the vSMF. New steps also include step 23i (post NSMF-pdu-session/pdu-session/update) from vSMF+UPF+S5-C/U to hSMF+hUPF.

Figure 11A:
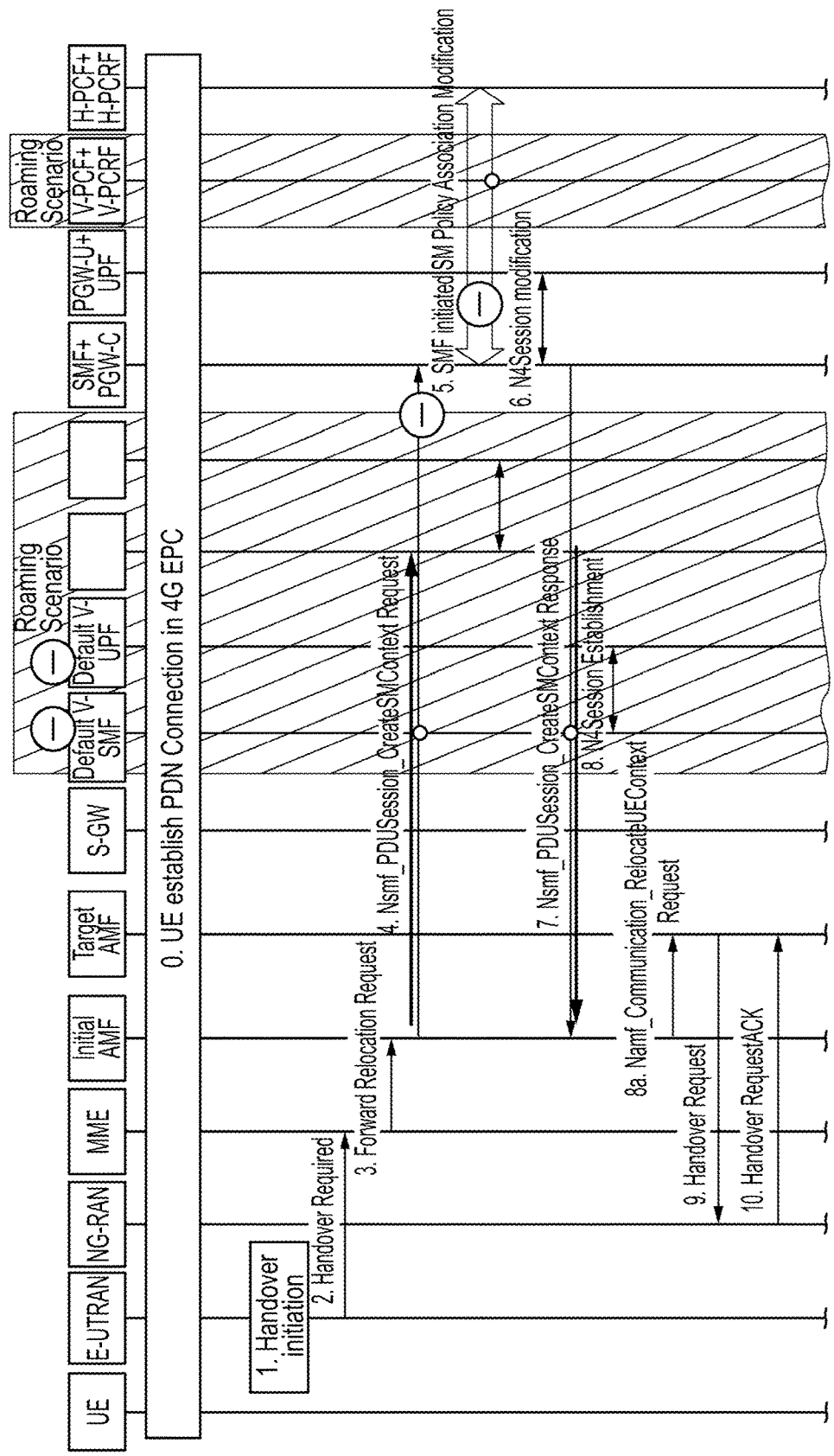
FIG. 11A is a first part of a sequence diagram illustrating 4G to 5G handover in accordance with some aspects of the disclosed technology.
Figure 11D:
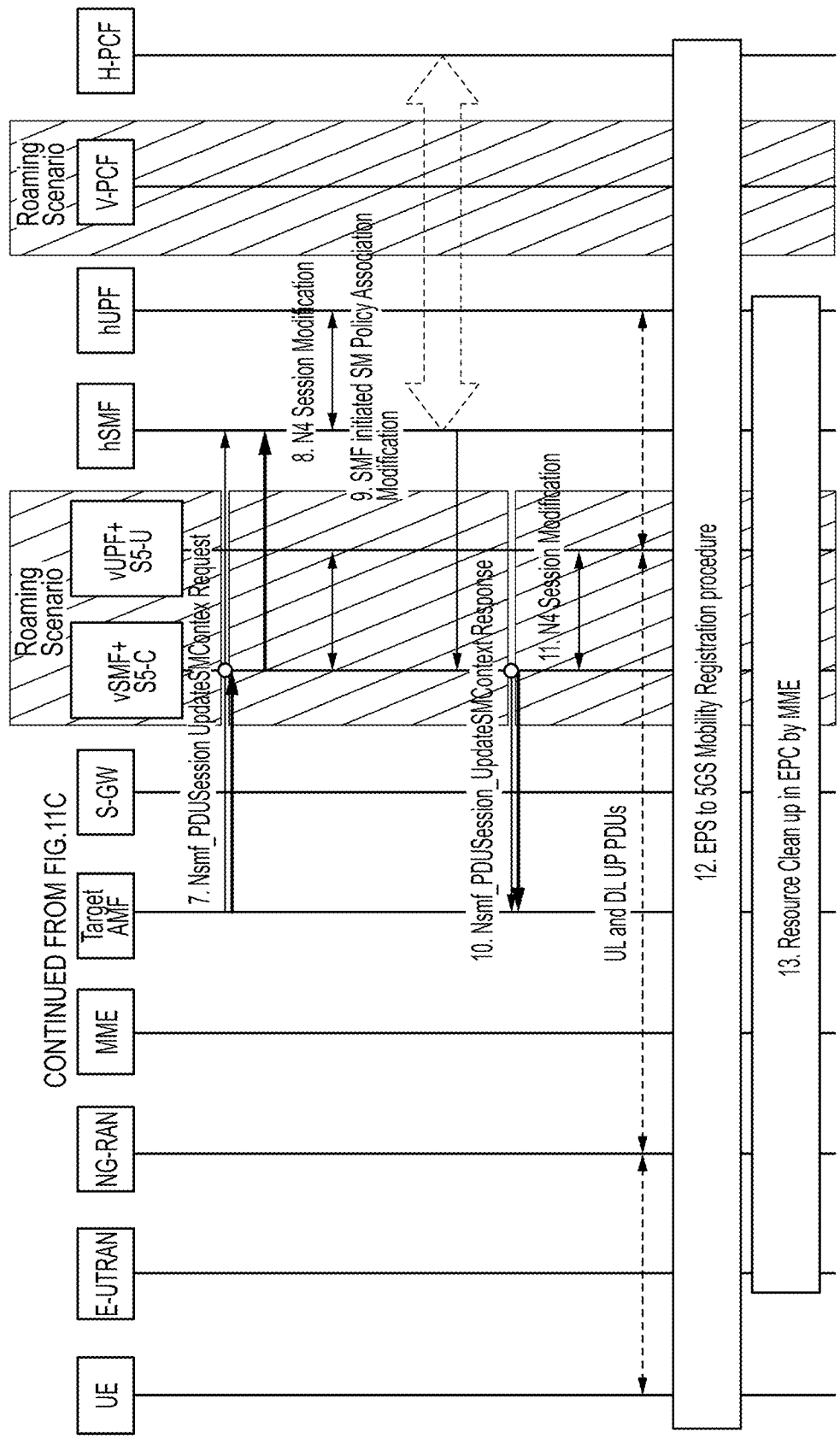
FIG. 11D is a fourth part of the sequence diagram illustrating 4G to 5G handover in accordance with some aspects of the disclosed technology.

FIG. 11AD are an example sequence diagram for 4G to 5G handover in accordance with some aspects of the disclosed technology. The new steps are described below.

In FIG. 11A, step 3 contains the address of (Target) vSMF as PGW-C address. The AMF is configured based on this address and the MCC+MNC of IMSI of UE to identify that this is a roaming scenario. The AMF does not know the URI of the context in V-SMF. The AMF does not perform vSMF selection, but uses the vSMF address in the Context from MME.

The new steps include step 4 from initial AMF to vSMF, step 6 between vSMF and hSMF, step 7 from vSMF to initial AMF, step 11 from target AMF to vSMF, step 12 between vSMF and hSMF, and step 13 from vSMF to target AMF. During the handover from 4G to 5G, an "initial AMF" may be selected, which does not support the slice that a mobile needs to be served by. In such a case, a "target" AMF that serves the slice that the UE belongs to is selected. These are terms carried over from existing 3GPP specifications.

Initially, SGW communicates with vUPF+S5-U, which communicates with hUPF. The new steps also include step 7 from target AMF to vSMF+S5-C, step 7b from vSMF+S5-U to hSMF, step 8 between vSMF+S5-C and vUPF+S5-U, step 7c acknowledgement from hSMF to vSMF+S5-C, and step 10 from vSMF+S5-C to target AMF.

The method for starting on 5G includes registration on 5G, PDU Session creation on 5G, handover to 4G with N26 or handover to 4G without N26 ("handover attach" scenario).

Figure 12A:
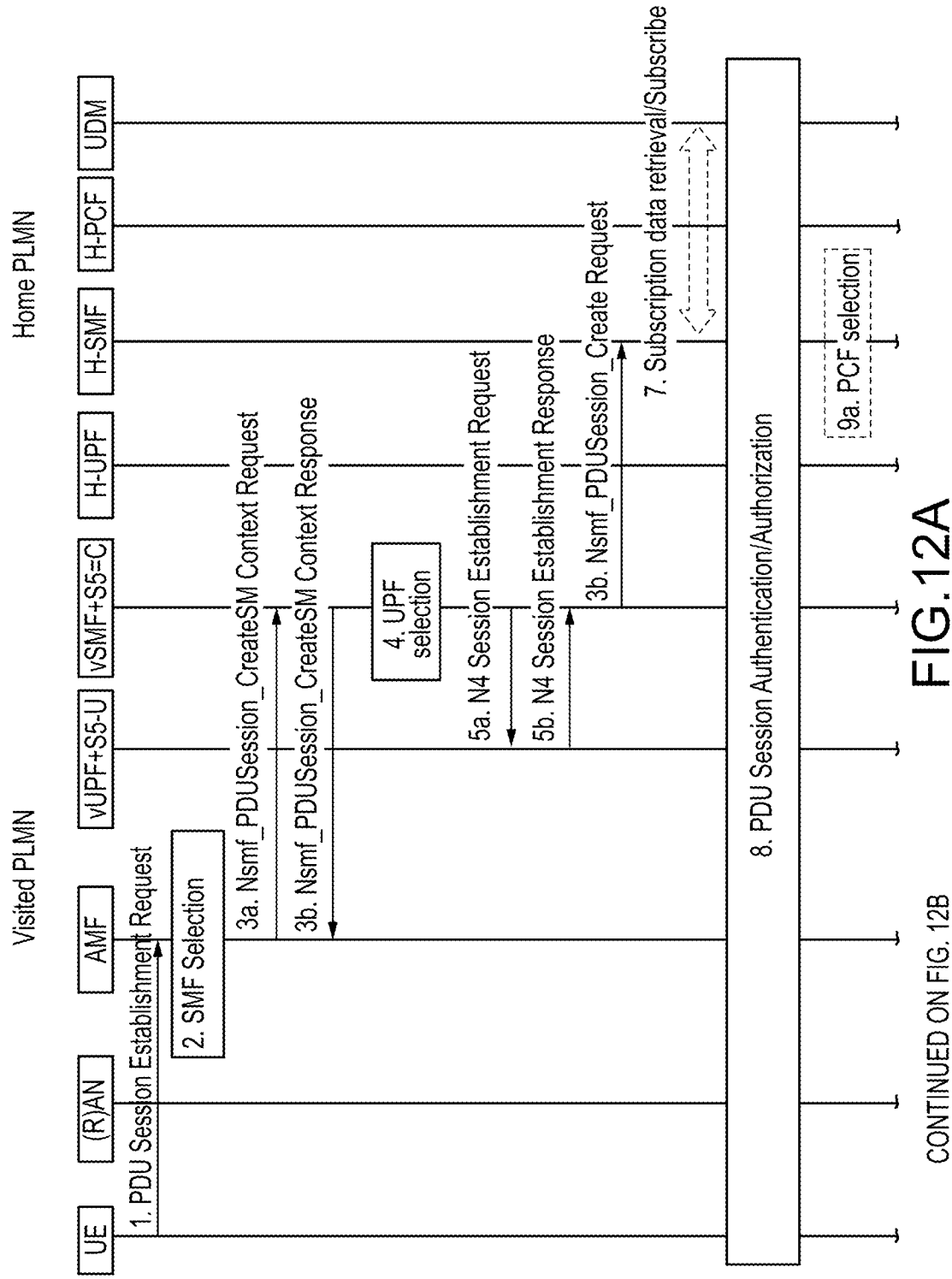
FIG. 12A is a first part of a sequence diagram illustrating PDU session creation in accordance with some aspects of the disclosed technology.
Figure 12B:
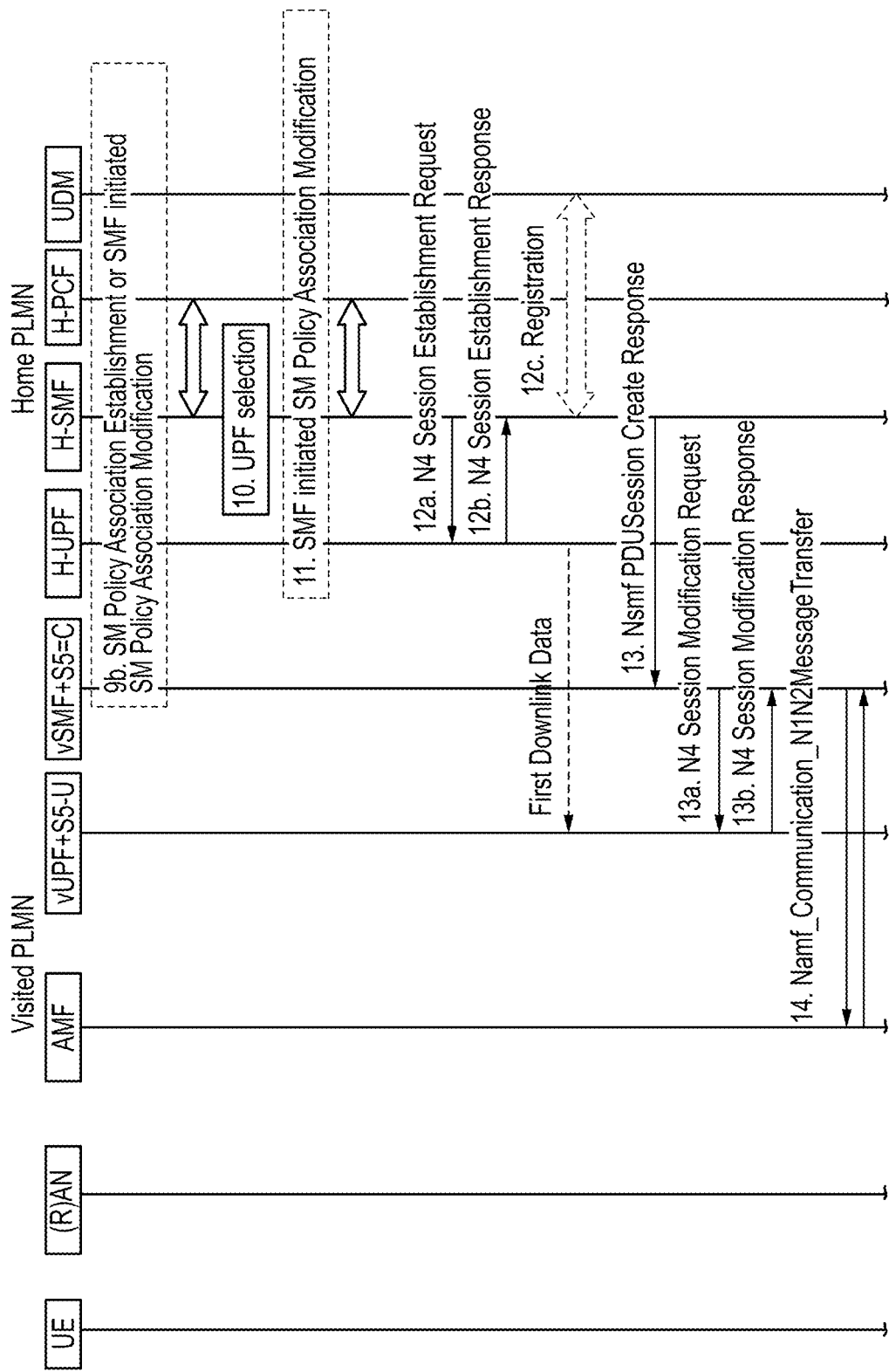
FIG. 12B is a second part of a theequence diagram illustrating PDU session creation in accordance with some aspects of the disclosed technology.
Figure 12C:
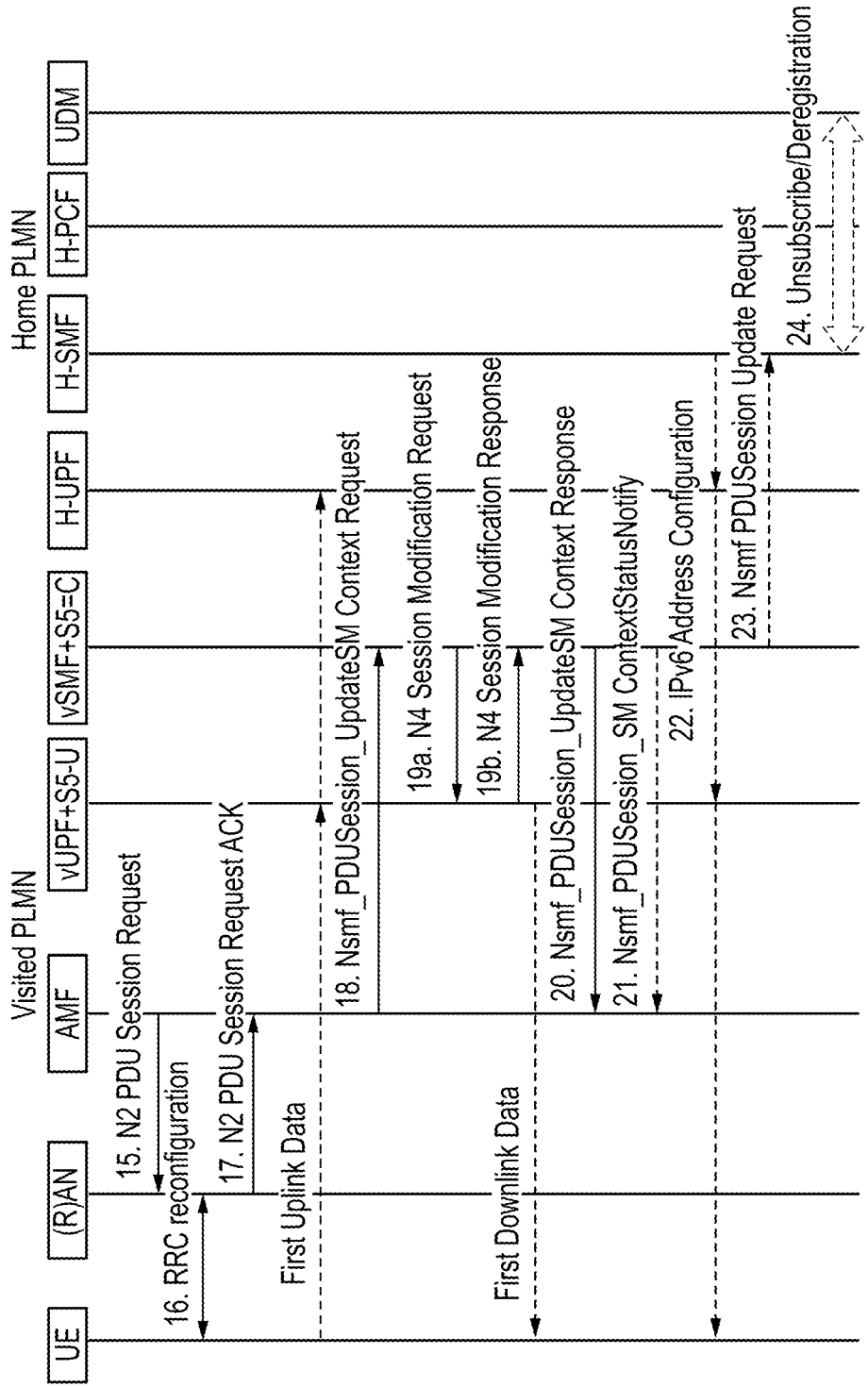
FIG. 12C is a third part of the sequence diagram illustrating PDU session creation in accordance with some aspects of the disclosed technology.

FIGS. 12A-C are a sequence diagram illustrating PDU session creation in accordance with some aspects of the disclosed technology. Only one step 7 is added. At step 7, the hSMF registers the FQDN of the vSMF in the UDM as the PGW-C ID to support "handover attach". The hSMF has the FQDN of the vSMF.

Figure 13A:
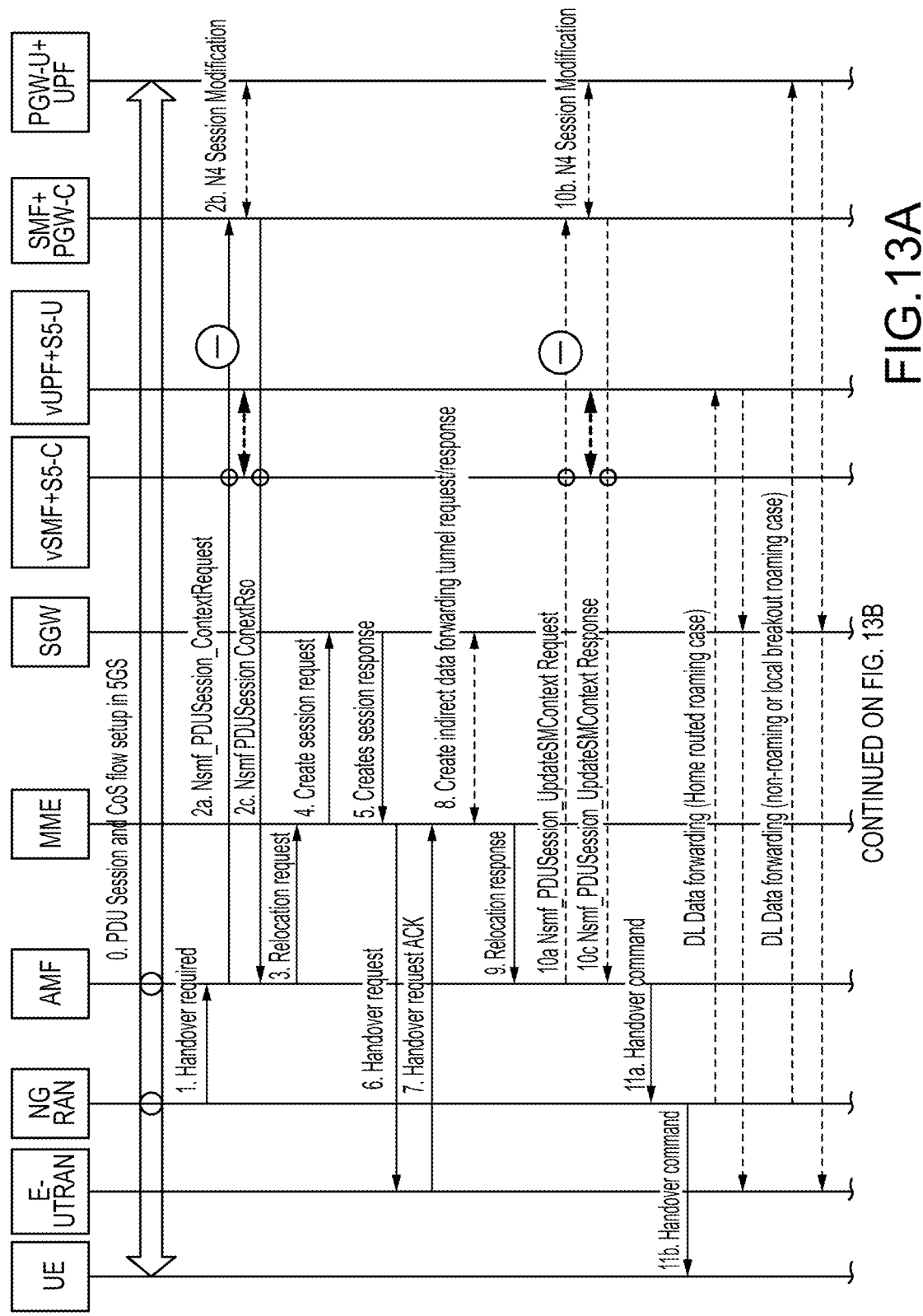
FIG. 13A is a first part of a sequence diagram illustrating 5G to 4G handover without interface N26 in accordance with some aspects of the disclosed technology.
Figure 13B:
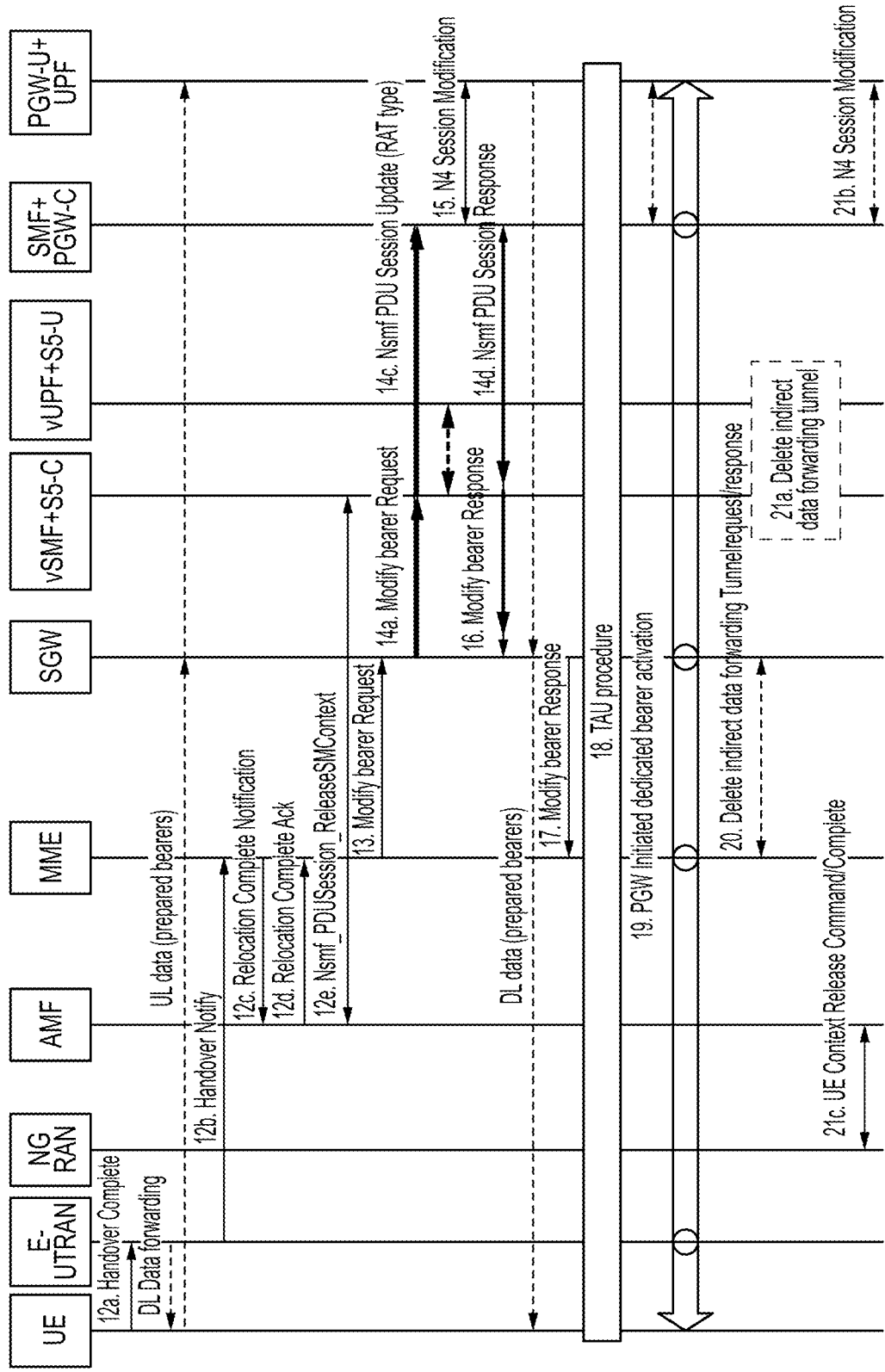
FIG. 13B is a second part of the sequence diagram illustrating 5G to 4G handover without interface N26 in accordance with some aspects of the disclosed technology.

FIGS. 13A-B are an example sequence diagram for 5G to 4G handover without interface N26 in accordance with some aspects of the disclosed technology. A few steps are newly added or modified from conventional operations. For example, in FIG. 13, step 2b (N4 session modification) between vSMF+S5-C and vUPF+S5-U, the v-SMF+S5-C provides PGW-C address as itself. At new step 10b (N4 session modification) between vSMF+S5-C and vUPF+S5-U, the v-SMF+S5-C provides PGW-C address as itself. At new steps 14a, 14b, 14c, and 14d are added among SGW, vSMF+S5-C, vUPF+S5-U, and SMF+PGW-C.

Aspect 1. A method for supporting roaming between Evolved Packet Core (EPC) and 5G core (5GC), the method including: provisioning a mobile network operator including 4G coverage in a 4G network and 5G coverage in a 5G network, the mobile network operator including Visited Session Management Function (vSMF) in communication with a 5G base station in communication, and an EPC including a gateway in communication with a 4G base station; configuring 5G roaming interface as 4G roaming interface to enable the mobile network operator to upgrade 4G roaming without deploying 4G functionality and 4G roaming interfaces; communicating between the gateway and the vSMF to anchor mobility between 4G and 5G in the vSMF; and communicating between the vSMF and home SMF in a home operator using 5G roaming interfaces.

Aspect 2: The method of Aspect 1, wherein the 5G network comprises the vSMF plus Packet Network Data Gateway-Control (PGW-C) (vSMF+PGW-C) capability.

Aspect 3. The method of any of Aspects 1 to 2, wherein the 5GC network of the home operator comprises home SMF (hSMF), Policy Control Function (PCF), and Unified Data Management and Home Subscriber Service (UDM+HSS).

Aspect 4. The method of any of Aspects 1 to 3, further including selecting the gateway and the vSMF+PGW-C by Mobile Management Entity (MME) of the mobile network operator using Domain Name System (DNS).

Aspect 5. The method of any of Aspects 1 to 4, further including: selecting the hSMF of the home network operator by the vSMF.

Aspect 6. The method of any of Aspects 1 to 5, further including: mapping from 5G quality of Service (QoS) created by the hSMF from Policy and Charging Control (PCC) rules from the PCF, by the hSMF, to 4G QoS; and by the vSMF, when user equipment is in the EPC or the 5G network.

Aspect 7. The method of any of Aspects 1 to 6, wherein the 5G roaming interface comprise N9 and N16 interfaces.

Aspect 8. The method of any of Aspects 1 to 7, further including modifying the N16 interface between the vSMF of the 5G network of the mobile network operator and the hSMF of the home network operator.

Aspect 9. The method of any of Aspects 1 to 8, further including enabling the EPC and 5GC to interwork for home-routed roaming without using S8-U and S8-C roaming interfaces.

Aspect 10. The method of any of Aspects 1 to 9, wherein the 5GC network of the home operator comprises home user plane function (hUPF), wherein the 5G network of the mobile network operator comprises visited user plane function (vUPF).

Aspect 11. The method of any of Aspects 1 to 10, further including: forming an N9 tunnel from the hUPF of the 5GC network of the home operator to the vUPF of the 5G network of the mobile network operator for forwarding indirect data; forming an S5 tunnel from the vUPF to the gateway; and forwarding the indirect data from the hUPF during handover between 4G and 5G using the S5 tunnel in the mobile network operator.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed:

1. A system for supporting roaming between LTE Evolved Packet Core (EPC) network and 5G network of a first mobile network operator by stand alone (SA) 5G core (5GC) network of a second network operator, the system comprising:
 at least one memory, storing instructions, which when executed by the system, cause the system to:
  determine that a UE is attempting to connect to an LTE network operated by the first mobile network operator;
  establish a connection between a serving gateway of the LTE network of the first mobile network operator with a Visited Session Management Function (vSMF) of the 5G network of the first mobile network operator by communicating over an S5 interface for control plane;

communicate between the serving gateway and the vSMF to anchor mobility between the LTE network and the 5G network in the vSMF;

communicate between the vSMF and home SMF (hSMF) in a home operator using 5G roaming interfaces comprising interfaces N9 and N16;

communicate with the hSMF, by the vSMF, over the N16 interface for control plane to configure quality of service rules for handover between the LTE network and the 5G network;

form a N9 tunnel from a home User Plane Function (hUPF) of the 5GC network of the second network operator to a visited user plane function (vUPF) of the 5G network of the first mobile network operator for forwarding indirect data;

form a S5 tunnel from the vUPF of the 5G network of the first mobile network operator to the serving gateway of the LTE network of the first mobile network operator; and forward the indirect data from the hUPF of the 5GC network of the second network operator during handover between the LTE network and the 5G network using the S5 tunnel in the first mobile network operator.

2. The system of claim 1, wherein the 5G network comprises the vSMF plus Packet Network Data Gateway-Control (PGW-C) (vSMF+PGW-C) capability.

3. The system of claim 1, wherein the 5G network comprises vSMF+S5-C capability indication in Network Repository Function (NRF) to enable Access and Mobility Management Functions (AMF) to select the vSMF.

4. The system of claim 1, wherein the 5GC network comprises home user plane function (hUPF), Policy Control Function (PCF) and Unified Data Management and Home Subscriber Service (UDM+HSS).

5. The system of claim 1, wherein the N9 and N16 interfaces are configured as 4G roaming interfaces to enable the mobile network operator to upgrade 4G roaming without deploying 4G functionality and 4G roaming interfaces.

6. The system of claim 1, further comprising instructions which when executed cause the system to:

map from 5G quality of Service (QOS) created by the hSMF from Policy and Charging Control (PCC) rules from a Polcy Control Function (PCF), by the vSMF, to 4G QOS; and create roaming charge record, by the vSMF, when a user equipment is in the LTE network or the 5G network.

7. A method for supporting roaming between Evolved Packet Core (EPC) LTE network and 5G network of a first mobile network operator by stand alone (SA) 5G core (5GC) network of a second network operator, the method comprising:

determining that a UE is attempting to connect to an LTE network operated by the first mobile network operator;

establishing a connection between a serving gateway of the LTE network of the first mobile network operator with a Visited Session Management Function (vSMF) of the 5G network of the first mobile network operator by communicating over an S5 interface for control plane;

communicating between the serving gateway and the vSMF to anchor mobility between the LTE network and the 5G network in the vSMF;

communicating between the vSMF and home SMF (hSMF) in a home operator using 5G roaming interfaces comprising interfaces N9 and N16;

communicating with the hSMF, by the vSMF, over the N16 interface for control plane to configure quality of service rules for handover between the LTE network and the 5G network;

forming a N9 tunnel from a home User Plane Function (hUPF) of the 5GC network of the second network operator to a visited User Plane Function (vUPF) of the 5G network of the first mobile network operator for forwarding indirect data;

forming a S5 tunnel from the vUPF of the 5G network of the first mobile network operator to the serving gateway of the LTE network of the first mobile network operator; and forwarding the indirect data from the hUPF of the 5GC network of the second network operator during handover between the LTE network and the 5G network using the S5 tunnel in the first mobile network operator.

8. The method of claim 7, further comprising roaming charged by the vSMF rather than the serving gateway.

9. The method of claim 7, further comprising:

mapping from 5G quality of Service (QOS) created by the hSMF from Policy and Charging Control (PCC) rules from a Policy Control Function (PCF), by the hSMF, to 4G QOS; and creating roaming charge record, by the vSMF, when a user equipment is in the EPC or the 5G network.

10. The method of claim 7, further comprising modifying the N16 interface between the vSMF and the hSMF.

11. The method of claim 7, further comprising selecting, by the vSMF, a home SMF (hSMF) of the 5GC network of the second network operator.

12. The method of claim 7, further comprising selecting the gateway and the vSMF+PGW-C by Mobile Management Entity (MME) using Domain Name System (DNS).

13. The method of claim 7, wherein the interfaces N9 and N16 are configured as 4G roaming interfaces to enable the mobile network operator to upgrade 4G roaming without deploying 4G functionality and 4G roaming interfaces.

14. A non-transitory computer-readable medium comprising instructions, the instructions, when executed by a computing system, cause the computing system to:

determine that a UE is attempting to connect to an LTE network operated by a first mobile network operator;

establish a connection between a serving gateway of the LTE network of the first mobile network operator with a Visited Session Management Function (vSMF) of a 5G network of the first mobile network operator by communicating over an S5 interface for control plane;

communicate between the serving gateway and the vSMF to anchor mobility between the LTE network and the 5G network in the vSMF;

communicate between the vSMF and home SMF (hSMF) in a home operator using 5G roaming interfaces comprising interfaces N9 and N16;

communicate with the hSMF, by the vSMF, over the N16 interface for control plane to configure quality of service rules for handover between the LTE network and the 5G network;

form a N9 tunnel from a home User Plane Function (hUPF) of a 5GC network of a second network operator to a visited User Plane Function (vUPF) of the 5G network of the first mobile network operator for forwarding indirect data;

form a S5 tunnel from the vUPF of the 5G network of the first mobile network operator to the serving gateway of the LTE network of the first mobile network operator; and forward the indirect data from the hUPF of the 5GC network of the second network operator during handover between the LTE network and the 5G network using the S5 tunnel in the first mobile network operator.

15. The non-transitory computer-readable medium of claim 14, wherein the computer-readable medium further comprises instructions that, when executed by the computing system, cause the computing system to roam charged by the vSMF rather than the serving gateway.

16. The non-transitory computer-readable medium of claim 14, wherein the computer-readable medium further comprises instructions that, when executed by the computing system, cause the computing system to:

map from 5G quality of Service (QOS) created by the hSMF from Policy and Charging Control (PCC) rules from a Policy Control Function (PCF), by the vSMF, to 4G QOS; and create roaming charge record, by the vSMF, when a user equipment is in the LTE network or the 5G network.

17. The non-transitory computer-readable medium of claim 14, wherein the computer-readable medium further comprises instructions that, when executed by the computing system, cause the computing system to modify the N16 interface between the vSMF and the hSMF.

18. The non-transitory computer-readable medium of claim 14, wherein the computer-readable medium further comprises instructions that, when executed by the computing system, cause the computing system to select, by the vSMF, a home SMF (hSMF) of the 5GC network of the second network operator.

19. The non-transitory computer-readable medium of claim 14, wherein the computer-readable medium further comprises instructions that, when executed by the computing system, cause the computing system to select the gateway and a vSMF+PGW-C by Mobile Management Entity (MME) using Domain Name System (DNS).

20. The non-transitory computer-readable medium of claim 14, wherein the interfaces N9 and N16 are configured as 4G roaming interfaces to enable the mobile network operator to upgrade 4G roaming without deploying 4G functionality and 4G roaming interfaces.

* * * * *